US010453109B2

(12) United States Patent
Paton

(10) Patent No.: US 10,453,109 B2
(45) Date of Patent: Oct. 22, 2019

(54) EVALUATION AND TRAINING FOR ONLINE VEHICLE REQUEST AND RESPONSE MESSAGING

(71) Applicant: SCI LIMITED, Markham (CA)

(72) Inventor: Ross Kenneth McKenzie Paton, Toronto (CA)

(73) Assignee: SCI Limited, Ontario (CA)

( * ) Notice: Subject to any disclaimer, the term of this patent is extended or adjusted under 35 U.S.C. 154(b) by 638 days.

(21) Appl. No.: 14/813,178

(22) Filed: Jul. 30, 2015

(65) Prior Publication Data
US 2017/0032440 A1 Feb. 2, 2017

(51) Int. Cl.
*G06Q 30/00* (2012.01)
*G06Q 30/06* (2012.01)
*H04L 12/58* (2006.01)

(52) U.S. Cl.
CPC ......... *G06Q 30/0625* (2013.01); *H04L 51/02* (2013.01)

(58) Field of Classification Search
CPC ...................................... G06Q 30/0601–0645
USPC ................................................ 705/26.1–27.2
See application file for complete search history.

(56) References Cited

U.S. PATENT DOCUMENTS

| 8,615,778 B1* | 12/2013 | Evans | ............. | H04N 21/25891 |
| | | | | 725/119 |
| 9,020,837 B1* | 4/2015 | Oakes, III | .......... | G06Q 30/0271 |
| | | | | 705/26.1 |
| 2003/0009373 A1* | 1/2003 | Ensing | ............... | G06Q 10/0637 |
| | | | | 705/7.33 |
| 2009/0063470 A1* | 3/2009 | Peled | .................... | G06F 17/278 |
| 2013/0018686 A1* | 1/2013 | Wright | ............ | G06Q 10/06311 |
| | | | | 705/7.14 |
| 2014/0119531 A1* | 5/2014 | Tuchman | ............ | H04M 3/5166 |
| | | | | 379/265.09 |
| 2015/0046233 A1* | 2/2015 | Srulowitz | ........ | G06Q 10/06398 |
| | | | | 705/7.42 |
| 2015/0310752 A1* | 10/2015 | Barrett | .................... | G09B 5/08 |
| | | | | 434/219 |

(Continued)

OTHER PUBLICATIONS

Ricks, J. E. (1995). The strategic value of the self-monitoring sales performance model furthering adaptive sales (Order No. 9536584). Available from ProQuest Dissertations & Theses Global. (304225980). Retrieved from https://search.proquest.com/docview/304225980?accountid=14753 (Year: 1995).*

*Primary Examiner* — Jason B Dunham
*Assistant Examiner* — Arielle E Weiner
(74) *Attorney, Agent, or Firm* — Occhiuti & Rohlicek LLP

(57) ABSTRACT

A method for evaluating an electronic response message by a vehicle product vendor for an online electronic inquiry message from a consumer concerning a vehicle product inquiry, the method comprising the steps of: receiving the online electronic inquiry message; identifying the inquiry content pertaining to each of the plurality of inquiry content categories; receiving the electronic response message; identifying the response content pertaining to each of the plurality of response content categories; scoring each of the response content; comparing a message reception timestamp and a message send timestamp; generating a response score by combining the quantitative score to the message send timestamp and the quantitative score to the assigned response content; and sending a score message.

25 Claims, 15 Drawing Sheets

(56) References Cited

U.S. PATENT DOCUMENTS

2016/0205250 A1\* 7/2016 Loftus ................ H04M 3/5175
379/265.06

\* cited by examiner

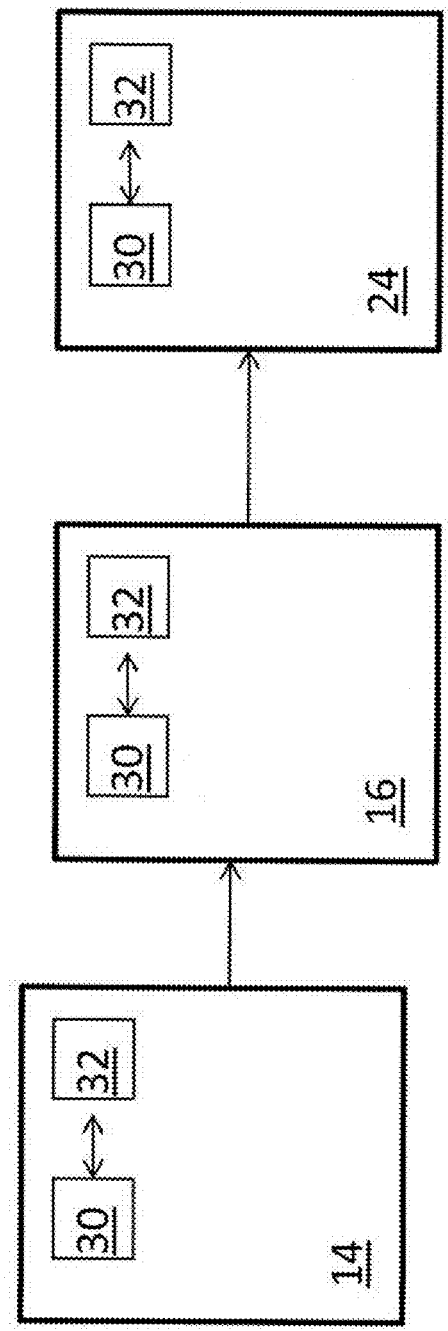

Table 1
Response Score Subgroup Metrics

16

| Initial Response Score Subgroup | Responses Reviewed | Average Score | New Vehicle Sales | Dealer Close Rate | Upper 90% C.I. | Lower 90% C.I. |
|---|---|---|---|---|---|---|
| [-20,-10) | 310 | -15.0 | 10 | 3.23% | 4.87% | 1.58% |
| [-10,0) | 305 | -8.7 | 10 | 3.28% | 4.95% | 1.61% |
| [0,10) | 252 | 4.0 | 10 | 3.97% | 5.98% | 1.95% |
| [10,20) | 266 | 13.8 | 10 | 3.76% | 5.67% | 1.85% |
| [20,30) | 200 | 23.6 | 10 | 5.00% | 7.53% | 2.47% |
| [30,40) | 156 | 33.1 | 10 | 6.41% | 9.63% | 3.19% |
| [40,50) | 116 | 42.7 | 10 | 8.62% | 12.89% | 4.35% |
| [50,60) | 125 | 54.0 | 10 | 8.00% | 11.98% | 4.02% |
| [60,70) | 152 | 63.5 | 10 | 6.58% | 9.88% | 3.28% |
| [70,80) | 88 | 73.2 | 10 | 11.36% | 16.91% | 5.82% |
| [80,90) | 56 | 83.0 | 10 | 17.86% | 26.25% | 9.46% |
| [90,100] | 59 | 90.3 | 10 | 16.95% | 24.96% | 8.94% |

Figure 4

Response Score and Dealer Close Rate Relationship as a Continuous Function

| Request a Quote Scorecard (TCI IQR) | | |
|---|---|---|
| Profile | Points | Question Type |
| Dealerships | 0 | Drop down |
| Lead Submission Date | 0 | Open Field |
| Copy and paste lead notifier URL here | 0 | Open Field |
| Lead Responder | 0 | Open Field |
| In Dealership Visit? | 0 | Radio button - Yes/No |
| Request Type | 0 | Radio button - 7 Options |
| Response Time | Points | |
| Under 15 minutes | 10 | Radio button |
| Under 45 minutes | 5 | Radio button |
| Over 45 minutes | 0 | Radio button |
| Over 2 hours | (-5) | Radio button |
| (choose only one) | | |
| Total Response Time | 10 | |
| Content | Points | |
| 1. Introduction/Greeting | 10 | |
| Greeting with name | 2.5 | Radio button - Yes/No |
| Introduction | 2.5 | Radio button - Yes/No |
| Included Position/Title | 2.5 | Radio button - Yes/No |
| Appreciation/Thanks for inquiry | 2.5 | Radio button - Yes/No |
| 2. Vehicle Value Proposition/Availability | 15 | |
| Uses Correct Vehicle(s) of Interest | 5 | Radio button - Yes/No |
| Stated Availability | 5 | Radio button - Yes/No |
| Included Vehicle Attributes/Alternative | 5 | Radio button - Yes/No |
| 3. Answered/Asked Question | 20 | |
| Asked a quality question | 20 | Radio button - Yes/No |
| Did not answer all the customers questions/Implied Request | (-10) | Radio button - Yes/No |
| 4. Price (choose one) | 20 | |
| Internet or Discount Price | 20 | Radio button |
| MSRP, incentive or payment range | 10 | Radio button |
| no price included | 0 | Radio button |
| 5. Dealership Value Proposition/Signature | 15 | |
| Dealer differentiation | 5 | Radio button - Yes/No |
| Next steps/Calls to action | 5 | Radio button - Yes/No |
| Complete signature/contact | 5 | Radio button - Yes/No |
| Total Content | 80 | |
| Grammar | Points | |
| Choose one | | |
| No grammar mistakes | 0 | Radio button |
| Single grammar mistake | (-5) | Radio button |
| Multiple grammar mistakes | (-10) | Radio button |
| Template | Points | |
| Correct template | 2.5 | Radio button - Yes/No |
| Active Link to Dealer Website | 2.5 | Radio button - Yes/No |
| Phone number/Click to call | 2.5 | Radio button - Yes/No |
| Social Media Links | 2.5 | Radio button - Yes/No |
| Total Template | 10 | |
| Bonus | | |
| Link to Introduction Video or Video Walkaround | 10 | Radio button - Yes/No |

FIG. 14

EVALUATION AND TRAINING FOR ONLINE VEHICLE REQUEST AND RESPONSE MESSAGING

FIELD

The present disclosure relates to online interactions for potential vehicle product sales.

BACKGROUND

Many businesses rely heavily on their online presence to drive sales, with automotive dealers and financial service providers particularly dependant on this market. The majority of shoppers spend significant time researching their next purchase online, prior to any interaction with a product vendor (e.g. mortgage broker, insurance broker, vehicle dealership, etc.). During their pursuit of product knowledge, a customer may submit inquiries directly to product vendors of their choice, creating a virtual interaction with the product vendor (e.g. virtual walk-in to the dealership, actual visit of phone call to the broker, etc.). This is where many product vendors (e.g. sales consultants) struggle, as they view these customers as less serious shoppers than an actual interaction (e.g. dealership walk-in). Sales consultants who have adopted this mindset are missing out on a high percentage of shoppers who prefer to make first contact through online inquiries. Like many business problems, there is a need for statistical or factual support through evaluation and/or training to change current product vendor sales practices.

Online interaction between businesses and consumers continues to increase year over year. Consumers are able to use the Internet to gain upfront knowledge about products, and many prefer to introduce themselves online to suppliers. This creates an online market that businesses need to adapt to, and be trained in, for efficient and effective handling of customer inquiries. While this is a well-known market trend, many industries and individuals have been slow to accept it. This problem is prevalent in the financial services and the automotive industry, to name a few, specifically the sales consultants direct handling of customer inquiries.

For example, the Internet is allowing consumers in the automotive industry to attain expert vehicle and dealership knowledge to assist in their buying decisions. Research shows that as of January, 2014, 79% of automotive consumers researched vehicles or dealerships online prior to a dealer visit (Cars.com, 2014). These online visitors are able to inquire directly with a dealer about specific vehicles, or vehicle lines. From this point forward it is up to the dealer to secure the customer through their digital presence. It is recognized that there are inherent problems with current dealership's initial responses to customer inquiries and the likelihood of the customer purchasing a vehicle from that specific dealership. What is needed are efforts in supporting quality response practices.

SUMMARY

It is an object of the present invention to provide a system and method for evaluation of online messaging to obviate or mitigate at least one of the above presented disadvantages.

A first aspect provided is a method for evaluating an electronic response message by a vehicle product vendor for an online electronic inquiry message from a consumer concerning a vehicle product inquiry, the method comprising the steps of: receiving the online electronic inquiry message over a communications network, the electronic inquiry message containing inquiry content and a message reception timestamp, the inquiry content including a plurality of inquiry content categories associated with vehicle inquiries; identifying the inquiry content pertaining to each of the plurality of inquiry content categories by comparing the inquiry content to a definition of each of the plurality of inquiry content categories; receiving the electronic response message over a communications network, the electronic response message pertaining to the electronic message inquiry, the electronic response message containing response content including a plurality of response content categories associated with vehicle inquiries and a message send timestamp; identifying the response content pertaining to each of the plurality of response content categories by comparing the response content to a definition of each of the plurality of response content categories and assigning portions of the response content when identified to each of the plurality of response content categories; scoring each of the response content of each of the plurality of response content categories using a scoring model by assigning a quantitative score to the assigned response content of each of the plurality of response content categories, the qualitative scores based on at least one of whether the response content being present for a selected response content category and a degree of detail of the response content relative to the definition of the assigned response category; comparing the message reception timestamp and the message send timestamp and assigning a quantitative score to the message send timestamp based on a magnitude difference between the message reception timestamp and the message send timestamp; generating a response score by combining the quantitative score to the message send timestamp and the quantitative score to the assigned response content; and sending a score message representing the response score over the communications network for display on a user interface of the vehicle product vendor.

A second aspect provided is a system for evaluating an electronic response message by a vehicle product vendor for an online electronic inquiry message from a consumer concerning a vehicle product inquiry, the system comprising: a computer processor and associated memory storing instructions for execution by the computer processor for: receiving the online electronic inquiry message over a communications network, the electronic inquiry message containing inquiry content and a message reception timestamp, the inquiry content including a plurality of inquiry content categories associated with vehicle inquiries; identifying the inquiry content pertaining to each of the plurality of inquiry content categories by comparing the inquiry content to a definition of each of the plurality of inquiry content categories; receiving the electronic response message over a communications network, the electronic response message pertaining to the electronic message inquiry, the electronic response message containing response content including a plurality of response content categories associated with vehicle inquiries and a message send timestamp; identifying the response content pertaining to each of the plurality of response content categories by comparing the response content to a definition of each of the plurality of response content categories and assigning portions of the response content when identified to each of the plurality of response content categories; scoring each of the response content of each of the plurality of response content categories using a scoring model by assigning a quantitative score to the assigned response content of each of the plurality of response content categories, the qualitative scores based on at least one of whether the response content being present for a selected response content category and a degree of detail of the response content relative to the definition of the assigned response category; comparing the message reception timestamp and the message send timestamp and assigning a quantitative score to the message send timestamp based on a magnitude difference between the message reception timestamp and the message send timestamp; generating a response score by combining the quantitative score to the message send timestamp and the quantitative score to the assigned response content; and sending a score message representing the response score over the communications network for display on a user interface of the vehicle product vendor.

BRIEF DESCRIPTION OF THE DRAWINGS

The foregoing and other aspects will now be described by way of example only with reference to the attached drawings, in which:

FIG. 2 is are example messages of the system shown in FIG. 1;

FIG. 4 is a table of example response score metrics in operation of the inquiry service of FIG. 1;

FIG. 14 shows an example score of a proposed response of FIG. 1.

DETAILED DESCRIPTION OF PREFERRED EMBODIMENTS

Figure 1:
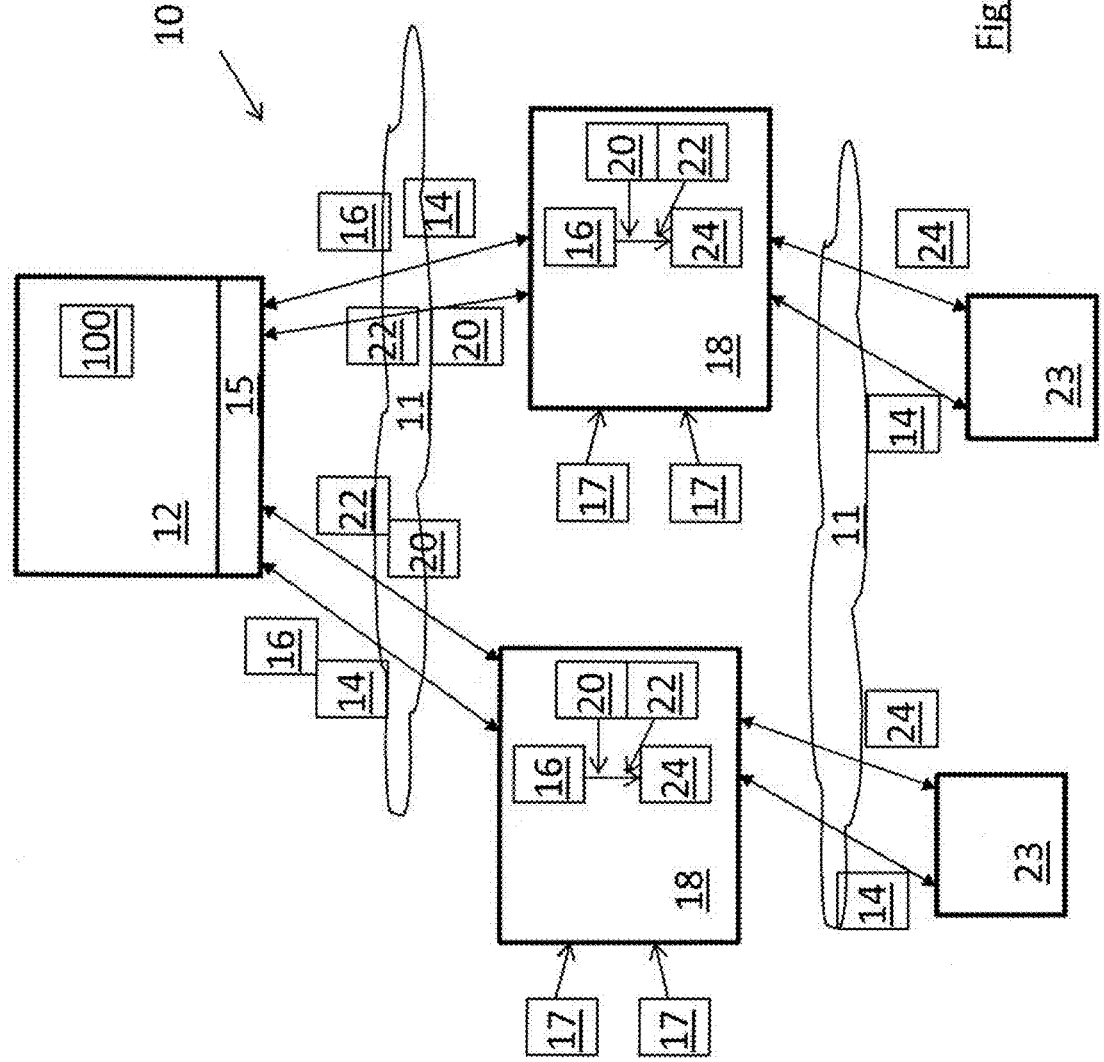
FIG. 1 is a system view of the online inquiry processing environment.

Referring to FIG. 1, shown is an online inquiry processing environment 10 including an inquiry server 12 hosting an inquiry service 15 for receiving online product requests 14 and proposed online product responses 16 for evaluation. The inquiry service 15 communicates with a plurality of product vendors 17 (e.g. sales people) over a communications network 11 to receive the online product requests 14 and proposed online product responses 16 forwarded by a sales server 18 accessed by the product vendors 17. For example, the product vendor 17 can have a user account 20 hosted by the sales server 18 and the inquiry service 15 can be in communication with a plurality of sales servers 18, as desired. The sales server 18 is also in communication over the communications network 11 with a plurality of potential customers 23, such that the online product requests 14 are originally received by the sales server 18 before being forwarded to the inquiry service 15. The product vendors 17 also generate and forward their proposed online product response 16 (to the received online product request 14) to the inquiry service 15 for evaluation. It is recognised that content of the online product requests 14 forwarded to the inquiry service 15 can be the same or different from the content originally received by the sales server 18.

The online inquiry processing environment 10 facilitates qualification and quantification of a quality initial product response 16 (e.g. email response) to a customer's online inquiry (e.g. product request 14) in terms of sales, or equivalently a product vendor's close rate.

Upon implementing an evaluation process 100 of the online product request 14 and the corresponding proposed online product response 16 (to the product request), the inquiry service 15 sends an evaluation score 20 and/or response corrections 22 (proposed or otherwise implemented) back to the sales server 18 for review by the product vendor 17, as further described below. It is also recognised that the evaluation process 100 can be implemented as an iterative process reflecting incremental steps in generation of a resultant online product response 24 for submission to and/or confirmation by the inquiry service 15, as further provided by example below. Once the product vendor 17 has finalized the proposed online product response 16 through interaction and review of the evaluation score 20 and/or response corrections 22 with the inquiry service 15, the product vendor 17 then sends the resultant online product response 24 (representing changes to the content of the original proposed online product response 16 based on the evaluation score 20 and/or response corrections 22) back to the potential customer 23 in response to the original online product request 14.

An example embodiment of the online inquiry processing environment 10 is where the product is a vehicle (e.g. a car, a truck, a recreational vehicle such as a boat, a motorcycle, etc.). The sales server 18 is associated with a vehicle dealership and the online requests 14 and resultant online responses 16 are in the form of written email communications (including appropriate multimedia content and text content) sent and received between the product vendor 17 (e.g. vehicle salesman) and the potential consumer 23 (e.g. potential vehicle purchaser). Content 30 of the online messages 14,16,24 (see FIG. 2) can include content such as but not limited to: consumer name; product vehicle of interest including identifying vehicle features (e.g. make, model, year, colour, vehicle options); one or more questions related to the vehicle of interest (e.g. vehicle pricing, vehicle availability, etc.); consumer contact details (e.g. return email address, telephone number, time of availability, etc.); vehicle dealer contact name; one or more answers related to the vehicle of interest (e.g. vehicle pricing, vehicle availability, etc.); vehicle vendor contact details (e.g. return email address, telephone number, time of availability, etc.). Defined categories 32 of the content 30, for use by the evaluation process 100, can include categories such as but not limited to: consumer introduction content; vehicle value proposition; vehicle features; vehicle availability; response to a consumer question; a question by the vehicle vendor; stated vehicle price; vehicle vendor value proposition; vehicle vendor contact details; grammar and spelling of the content 30; structure and content of a message subject line of the content 30; inclusion of active links; vehicle vendor introduction content; a question by the consumer; consumer value proposition (e.g. availability of a trade in vehicle); and/or consumer contact details. For example, the product of interest can be a vehicle such as: a passenger vehicle; a transport vehicle; a land-based recreational vehicle; or a water-based recreational vehicle. The electronic response message 16,24 can be an email directed to the consumer as a potential customer of a vehicle dealership 17. For example, the vendor 17 can be a specified vehicle dealership of a network of dealerships.

Referring again to FIG. 1 and FIG. 3a, the inquiry service 15 facilitates training of the product vendors 17 through their interaction with the inquiry service 15 over the communications network 11. As such, the inquiry service 15 is made available to the product vendors 17 as a training tool to help fine tune their online communications (i.e. content 30 of the resultant product responses 24) based on the content 30 of the original product request 14. The inquiry service 15 has a communications interface 103 for receiving the online messages 14,16 as well as for sending the results 20,22 of the evaluation process 100 in communication with the product vendor 17. It is recognized that the results 20,22 are displayed on a user interface 102 of a computing device 101 (see FIG. 3b) used by the product vendor 17, as a set of interactive information for use in training or otherwise advising the product vendor 17 in generating an online product response 24 with appropriate content 30 in view of the content 30 contained in the original product request 14. The inquiry service 15 also has an evaluation engine 104 for implementing steps of the evaluation process 100, based on following a scoring model 106 with access to response content categories 32 stored in a storage 123 (see FIG. 3a). The inquiry service also has an update engine 110 configured to implement an update process in response to feedback information 114 received from the product vendor 17 associated with a particular original product request 14 and/or based on a plurality of feedback information 114 received from a plurality of product vendors 17 and/or system administrator(s).

Online interaction between businesses (i.e. product vendors 17) and consumers 23 continues to increase year over year. Consumers 23 are able to use the Internet 11 to gain upfront knowledge about products, and many prefer to introduce themselves online to suppliers. This creates an online market that businesses can adapt to, and be trained in, for efficient and effective handling of customer inquiries (i.e. product requests 14) using the inquiry service 15 supplied by the inquiry server 12. As an example demonstration of the evaluation process 100, the following provides by example online message training processes applied in the automotive industry, specifically the dealership and sales consultants direct handling of customer inquiries, with the goal of utilizing data on the relationship between quality of the content 30 in the resultant response 24 and the likelihood of a product sale by the product vendor 17.

The inquiry service 15 provides interaction (e.g. training) with the product vendors 17 in order to generate a quality response 24 to a consumers email 14. There is a scoring algorithm 106 that is applied to emails 16, and the score 20 derived from this algorithm 106 has been shown to correlate directly with the chance of making a product sale. The inquiry service 15 can also be configured to provide for application of the scoring algorithm 106 to facilitate real-time scoring of emails 16. The evaluation process 100 can also act as a feedback loop for the algorithm 106, thus providing for the model 106 to be dynamically adjusted as more emails 16 are scored with respect to the original product requests 14. As further provided below, it is recognized that online request, online response, messages, and emails 14,16,22,24 can be used interchangeably.

In an effort to capture the vendor 17 (e.g. dealer) and customer 23 relationship, over 2000 initial email responses 16 to customers' vehicle inquiries 14 were reviewed. Each of these responses 16 was graded on a scale of −20 to 100, using a grading scheme (implemented by the scoring algorithm 106) that identified key content for an effective response 16. Some of the grading components (e.g. defined response content categories 32) can be the introduction, vehicle value proposition, price, dealer value proposition, and the time it took for the dealer 17 to respond 16,24 to the customer's request 14. These reviews were then split into subgroups and observed for an outcome of a sale or non-sale qualified as an outcome or feedback information 114.

The results of the application of the scoring algorithm 106 to the content 30 of the messages 14,16 showed that there is a strong, positive, relationship between the quality of the response 16,24 and the likelihood of a product sale. When observing the low end of the response content 30 quality spectrum, a response 16 with a score of −20 to −10 resulted in a 3.23% chance of a product sale. On the high end, a response 16 with a score of 90 to 100 resulted in a 16.95% chance of a product sale; over five times more likely to convert to a sale than the poorest responses. Additionally, the application of the scoring algorithm 106 identified that given any initial response score, a unique probability of a sale can be estimated to show the increased value of adding key content to the initial response 16 in order to result in generation of the resultant or amended product response 24, via the messages 20,22 provided to the product vendor 17 evaluation of the content 30 of the messages 14,16.

It is also recognized that the various components of the content 30 within an initial email response 16 can be more important than others, thus providing for appropriate weighting of specified response content categories 32 within the scoring algorithm 106. As such, this increased weighting by the scoring algorithm 10 for selected response content categories 32 can facilitate training for the product vendor 17 to pay special attention to the content 30 quantity/quality associated with those selected response content categories 32. By observing individual components 30 of an email, or a combination of components 30, the scoring algorithm 106 can identify which parts of the email are more relevant than others and to what degree. Accordingly, identification and weighting of particular content 30 associated with selected or otherwise designated response content categories 32 by the scoring model 106 during the evaluation process 100 can benefit sales consultants 17, providing for knowledge/creation of optimal email response templates that include only the most important parts of an email response 16,24, thus enabling a faster and more effective first response 24 to the customer 23. In addition, the scoring model 106 could accommodate for sales statistics on the product (e.g. vehicle) of interest of the product request 14, knowing some product types (e.g. vehicles) are more likely to result in a sale than others.

The automotive industry, like many others leverages data heavily to make business decisions or drive process improvement. The opportunity for the automotive industry is to assist the sales consultant 17 to connect a quality response 16,24 to an increased close rate. The educational leverage point is to assist the sales consultant 17 in understanding how the online consumer 23 wants to be engaged, much like there is a process for engaging an in-store customer, the processes for which are widely understood and utilized. By addressing the customer's questions 30 of the online product request 14 and providing adequate information content 30 in the product response 16,24, the sales person 17 can create a positive customer 23 experience and can facilitate increased sales close rates.

By including key components content 30 in the initial response, 16,24, such as but not limited to; timeliness, a strong introduction, vehicle value proposition, the price of the product (e.g. vehicle), and a vendor (e.g. dealer) value proposition, the sales consultant 17 can be more likely to engage with the customer 23 and translate that into a product (e.g. vehicle) sale. The described scoring algorithm 106 quantifies all of the content 30 components into an overall scoring metric to assess and identify a score for the response 16. With an attributed score to each initial dealer response 16 and a resultant binary event of a sale or no sale, a correlation between response quality and the likelihood of a sale can be utilized by the scoring model 106.

In the case example of vehicle sales activity resulting from online messaging 14,16, 24, the application of the scoring model 106 in the evaluation process 100 involved taking a large sample of initial dealer responses 16, scoring them, and grouping them by overall score. Within each of these subgroups a response 16 was taken at random, and the outcome of a sale or non-sale at the responding dealership was determined. This was repeated until a specified threshold of sales was reached for each subgroup. At this point each subgroup consisted of a proportion of sales to total dealer responses, and a dealer close rate was calculated as sales divided by total responses. Using this metric the correlation between response quality and likelihood of a sale was demonstrated.

Using a subset of North American automotive dealers 17, and initial email responses 16 to customer new vehicle inquiries 14 from Jan. 1, 2014 to Jun. 30, 2014 a stratified sampling approach was applied. All initial dealer responses 16 were assessed using the same scorecard consisting of more than 15 requirements by the scoring model 106, including content 30 such as response time, subject line, content, email signature, and grammar, with the score varying from −20 to 100. Initial response emails 16 were divided into twelve subgroups based on their overall score. Any emails 16 which were identified as undeliverable to the customer 23 were discarded from the scoring results, whether they were due to an invalid email address or declared as spam, in an effort to accurately capture the customer's 23 responsiveness to the initial email reply 16. Additionally, any email 14,16 indicating prior contact via phone or dealership visit was excluded since any follow-up emails 16 after making contact are more casual and the customer 23 is in a different point in the purchasing process. As such, the present evaluation process 100 is directed to online messaging 14,16,24 used as the only mode of communication for an initial product request 14 and an initial product response 16,24 to the initial product request 14.

In generation/refinement of the scoring model 106 used in the evaluation process 100, after the stratification to the population was applied and the invalid responses 16 were excluded, a negative binomial experiment was conducted on each of the subgroups. This consisted of selecting random responses 16 within a subgroup and determining whether a sale occurred or not. A sale was recognized if the customer 23 purchased a new vehicle from the dealership 17 within sixty days of the new vehicle inquiry 14. The statistical experiment continued until a total of ten sales occurred within the subgroup. This procedure was applied to all twelve subgroups, where each group then consisted of "R" responses sampled and ten sales. This was then used to obtain a dealer 17 close rate for each subgroup, obtained by dividing the number of sales (10) by the total number of responses (R) 16. Using this statistical experiment provided for each subgroup to be measured with consistency by the implemented scoring model 106, by providing all subgroups had equivalent sales totals. That is, each subgroup is provided to have the same number of positive (sale) events to facilitate initial testing of the scoring model 106 during model performance evaluation. The dealer close rate for each subgroup was then recorded, along with the number of sales and responses 16 reviewed.

Since this scoring model 16 performance evaluation process (e.g. model validation) provided a dichotomous outcome of either a success (sale) or a failure (non-sale), and the sample size for each subgroup consisted of over five successes or failures, a confidence interval was applied to each of the subgroup estimates. While these confidence intervals are provided, they are not the focal point of the model validation, but are instead included for reference. The scoring model 106 implementation and the model validation shows the relationship between the score and dealer close rate, which is independent of the confidence intervals on each of the estimates.

In an effort to transform during the model validation the subgroups from a qualitative variable into a quantitative variable and to represent the data as a continuous function, the scores for each record within a subgroup were averaged to create a point estimate within the subgroup. The data was then represented by twelve data points with the x-axis values being the average scores within the subgroups and the y-axis values as the dealer close rates. Using these twelve data points and applying a linear transformation, a regression was run to represent the sample with a smooth continuous function between −20 and 100. This continuous curve provides the ability to distinguish dealer close rate between the low end and high end scores within a subgroup, which previously would have been represented by one dealer close rate value for the range of scores. The continuous function can be implemented in the scoring model 106 when taking into account vendor close rates.

A total of 2317 initial email responses 16 from 1394 different US automotive dealerships 17 were scored; the emails 16 used were sent between January 1st and Jun. 30, 2014. Only responses 16 with confirmed email delivery to the customer 23 were selected. These responses 16 were segmented into their respective subgroups and the outcome of a sale or non-sale was observed. The response metrics are shown in Table 1 of FIG. 4.

Each subgroup consisted of a unique number of records ranging from 56 to 310. This variation was due to the statistical experiment method used for the scoring model 106 validation, where reviews were scored and counted until a threshold of ten new vehicle sales was observed. Associated with every subgroup is an average score within that sample and the dealer close rate which is calculated as a proportion of sales to responses reviewed. The table shows that a score between [80, 90) resulted in the highest dealer close rate at 17.86%. A response 16 score between [−20, −10) represented the lowest dealer close rate of 3.23%, less than a fifth of the close rate of the highest response 16 score subgroup. The standard error on the estimates increases as the response 16 scores increase, which is captured by the confidence interval. What the 90% confidence interval (C.I.) provides is a bound on the dealer close rate estimate for this specific sample. This can be read as, within each subgroup, it is expected that 90 out of 100 samples will result in a dealer close rate between the lower and upper 90% confidence intervals. This, however, is independent of the positive relationship between response score and dealer close rate.

Figure 5:
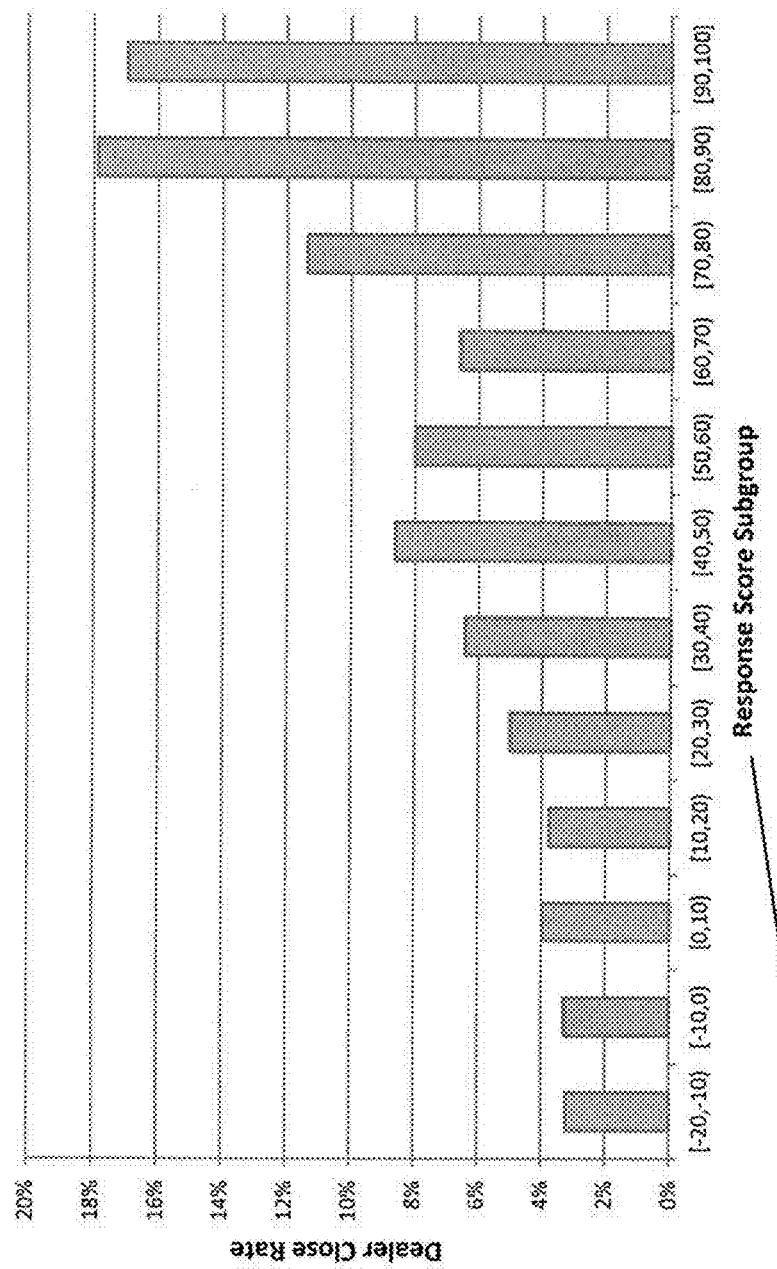
FIG. 5 shows example dealer close rates based on message analysis in operation of the inquiry service of FIG. 1.

FIG. 5 displays the determined (using the scoring model 106) increasing trend in dealer close rate as the response 16 scores increase, with some peaks and valleys evident in the data. Scores from −20 to 20 all have a dealer close rate below 4%, significantly lower than any other response 16 score subgroups. An increasing trend is observed up until the [40, 50) subgroup at 8.62%, where it then begins to regress for the next two subgroups. This valley was determined to not be a result of randomness, as when reviewing emails 16 there were a high volume of responses 16 observed in these score groups which used of a similar email response 16 template. This is a generic approach that many dealers adopted, and while this template addressed many of the desired components of a quality response 16, there was a lack of a personal touch that it appears the customers 23 were perceptive of. The top three subgroups, 70 to 100, all show a large increase to dealer close rate and confirm that with a higher quality of response 16, there can be an increased likelihood of a sale. This data shows the automotive dealer 17 of a factual relationship of a quality initial response to sales.

Figure 6:
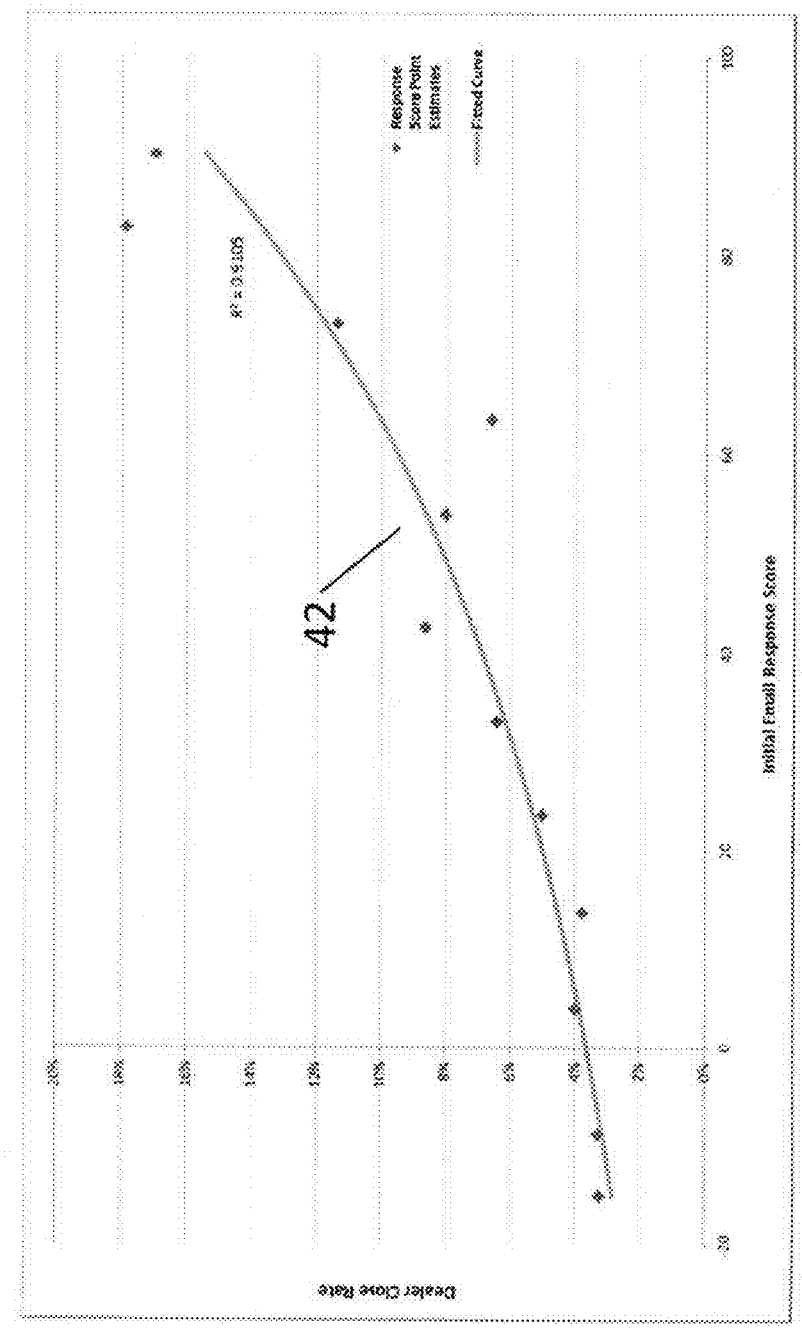
FIG. 6 is an example relationship of the scoring model of FIG. 1.
Figure 7:
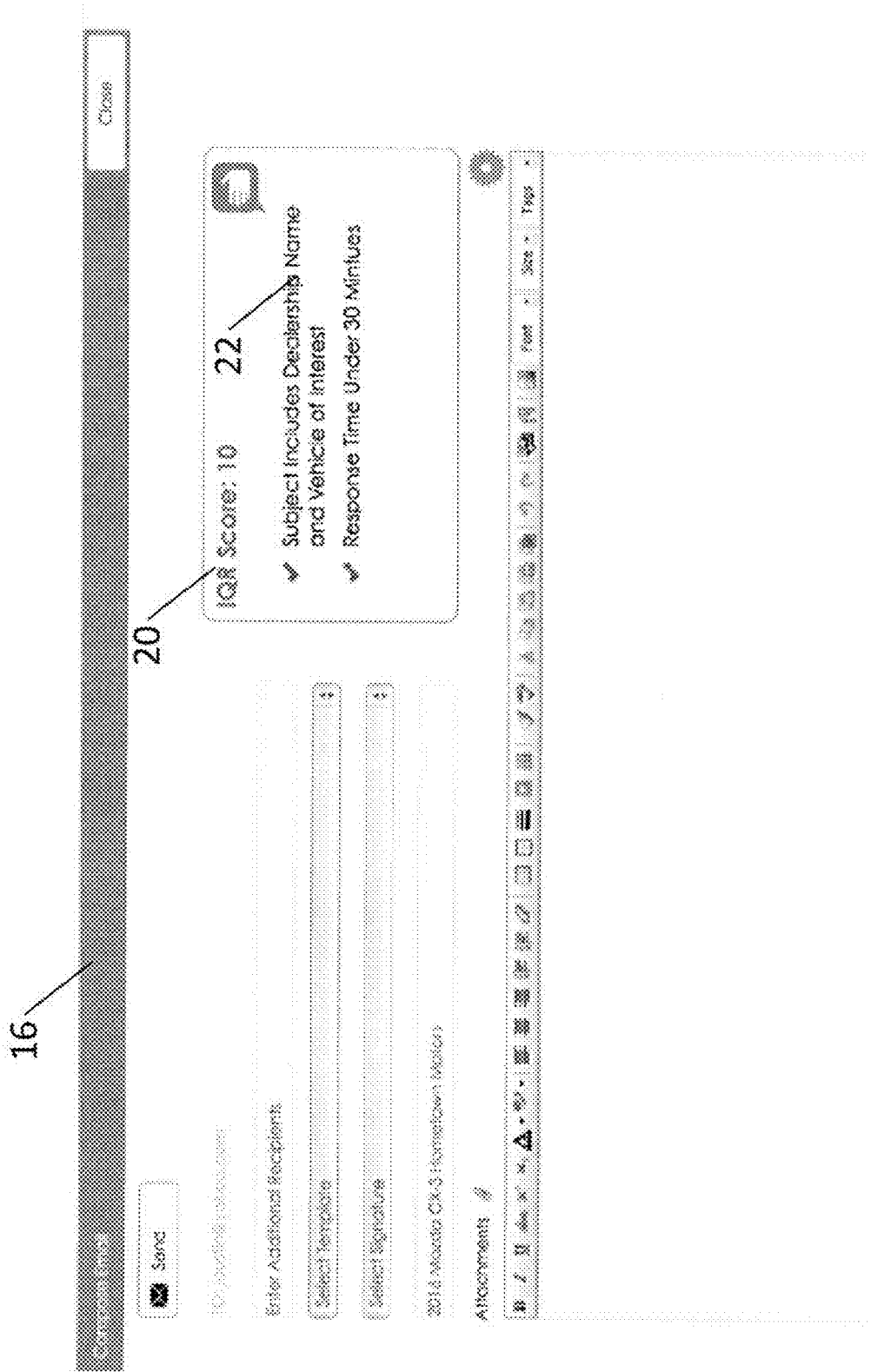
FIGS. 7-10 show example user interface displays of the vendor user interface of the system of FIG. 1 in operation.
Figure 8:
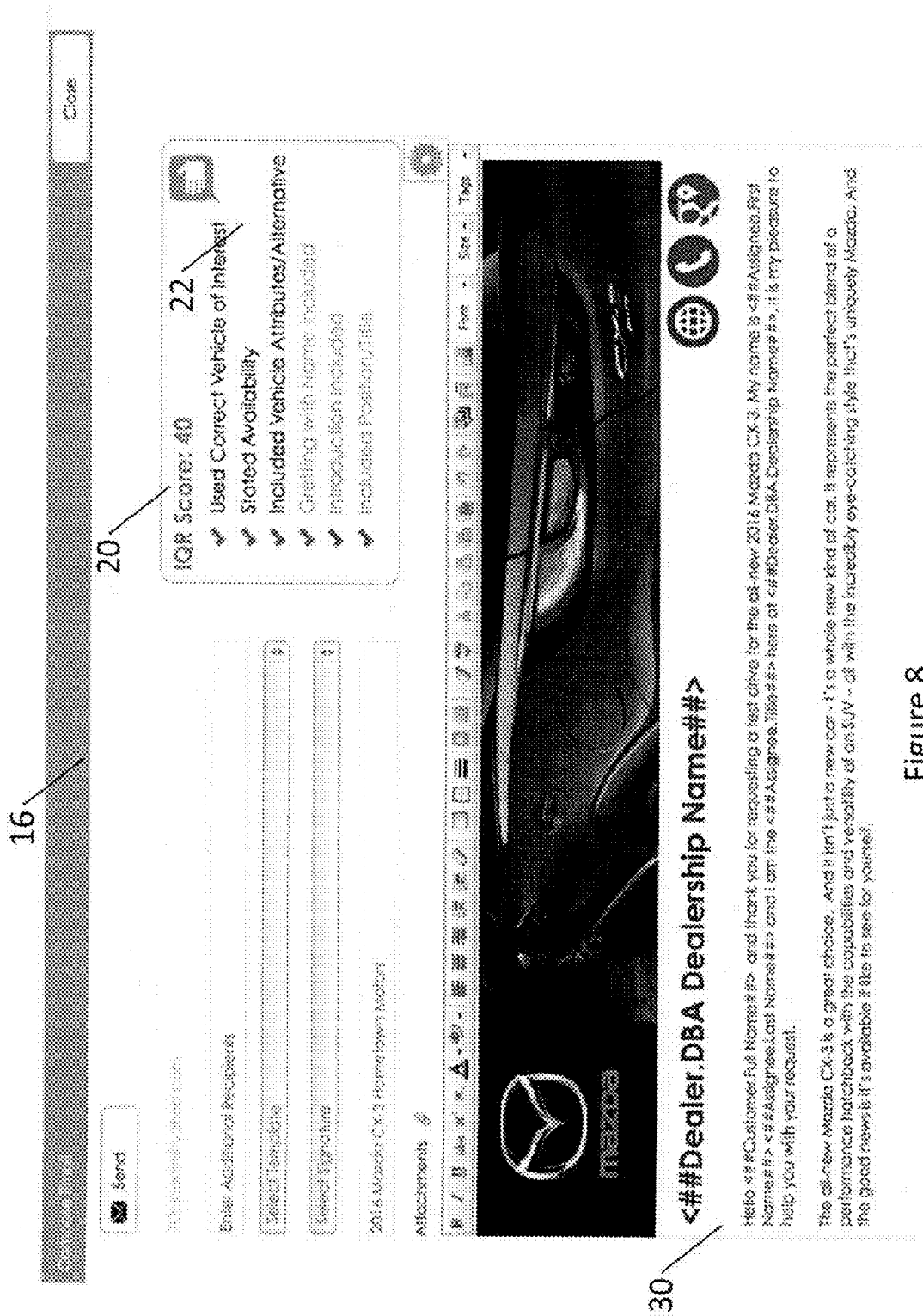
Figure 9:
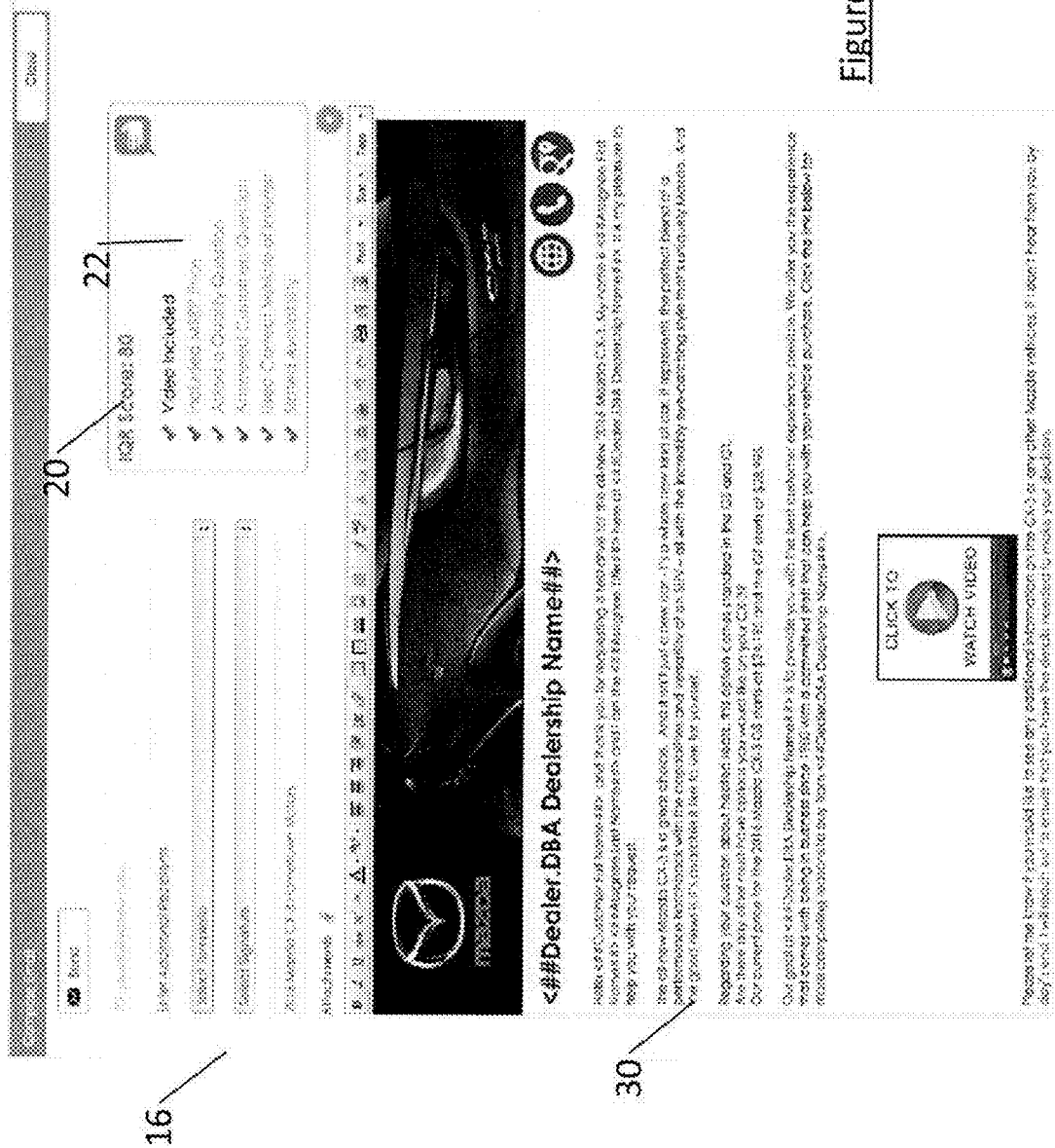
Figure 10:
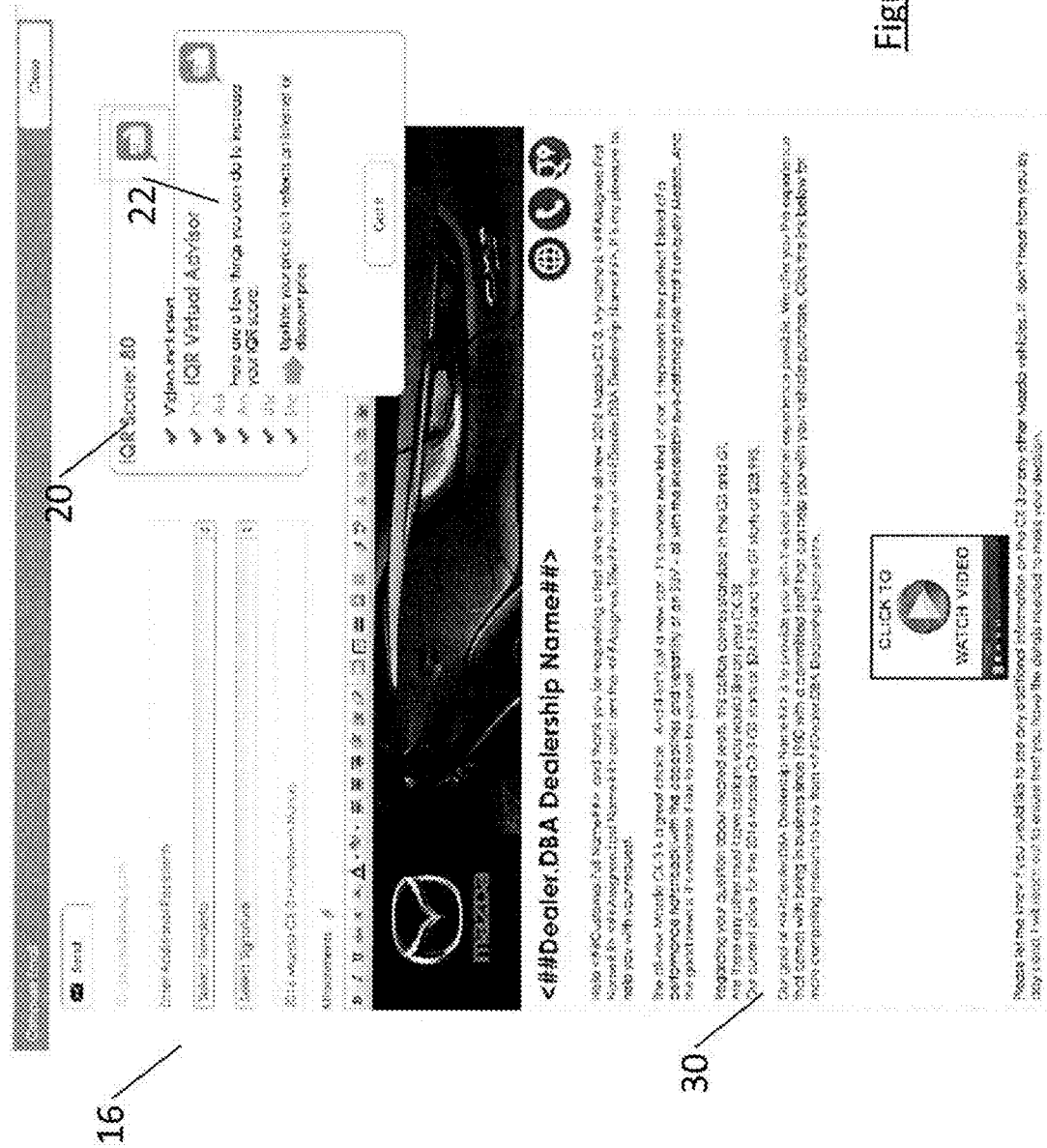

It is also recognized that there could be a downfall, however, to using subgroups to analyze the relationship between response 16 quality and dealer close rate. Within a subgroup there could be a maximum variance in score of nearly ten between any two responses. This is a larger spread than potential cross group variance. For example, if three responses are scored at 20, 27.5, and 30, 20 and 27.5 can be in the same subgroup with 30 being in the next subgroup; however the difference between 27.5 and 20 is larger than the difference between 30 and 27.5. In order to account for this, and to have a unique representation of dealer close rate for each unique score value, a continuous function 42 can be used in the scoring model 106 to represent the data. FIG. 6 presents the solution to this issue using point estimates and curve fitting.

The curve 42 produced to represent the point estimates proves to be a good fit, with an $R^2$ value of approximately 0.91 and p-value less than 0.05. The relation between response 16 score and dealer close rate is clearly observed from this function to be a positive, exponential relationship. It is recognized that a response 16 quality of over 90 results in over four times the likelihood of a sale compared to a response 16 score of zero or less. This curve achieves a function 42 that can be used to represent any possible score of an email response 16 and to identify a unique dealer close rate, thus showcasing the value of a quality response 16 in terms of sales through implementation of the scoring model 106 in the evaluation process 100.

In view of the above, demonstrated is an importance of a quality response 16 from vendor (e.g. an automotive dealer) to a customer's initial online inquiry 14. The sample has shown that when a dealer 17 sends a quality response 16,24, scoring 70 and higher, they are more than twice as likely to obtain a sale from the customer 23 when compared to a dealer 17 sending a response 16 with a score of less than 20. Given the data presented in this model validation, automotive dealers and sales consultants 17 can utilize interaction (e.g. training) with the inquiry service 15 to improve their current customer email response 16 practices to provide they are effectively answering customer inquiries 14 via content 30 analysis/evaluation using the scoring model 106 in the evaluation process 100, and providing enough information to engage in their response 16,24 content to the customer in further communication.

The scoring model 106 can also accommodate observation of the components 30 within the response 16,24, thereby providing value in identifying which components 30 of the email 16 have the greatest influence on a customer's 23 decision to buy and to what degree. In addition, the vehicle type of interest (e.g. product type of interest) can be taken into account by the scoring model 106, as some vehicle types can be more likely to result in a sale than others.

Referring again to FIG. 1, the inquiry service 15 facilitates training of the product vendors 17 through their interaction with the inquiry service 15 over the communications network 11. As such, the inquiry service 15 is made available to the product vendors 17 as the training tool, for example, to help fine tune their online communications (i.e. content 30 of the resultant product responses 24) based on the content 30 of the original product request 14. The communications interface 103 receives the online messages 14,16 as well as for sends the results 20,22 of the evaluation process 100 in communication with the product vendor 17 (e.g. via sales server 18). It is recognized that the results 20,22 are displayed on the user interface 102 of the computing device 101 (see FIG. 3*b*) used by the product vendor 17, as a set of interactive information for use in training or otherwise advising the product vendor 17 in generating the online product response 24 with appropriate content 30 in view of the content 30 contained in the original product request 14. The evaluation engine 104 implements steps of the evaluation process 100 in evaluation of the content 30 of the responses 16 in comparison to the content 30 contained in the requests 14, based on following the scoring model 106 with access to response content categories 32 stored in the storage 123.

Details of the scoring model 106 and associated rules 107 can include the scoring model 106 representing a correlation between the response score and a percentage chance of a product sale for a product of interest contained in the content 30 of the online inquiry message 14. The scoring model can also include a graduated score scale having a lower end and an upper end, the lower end score being less than the upper end score, such that a respective percentage chance of a product sale for a product of interest contained in the electronic inquiry message 14 is associated with a series of scores between the lower end and the upper end. Further, an inquiry content category 32 of the plurality of inquiry content categories 32 can be linked to a response content category 32 of the plurality of response content categories 32, such that presence of response content 30 assigned to the response content category 32 affects (e.g. changes) the magnitude scoring either upwards or downwards based on presence of inquiry content 30 assigned to the inquiry content category 32 in the inquiry message 14.

In the evaluation process 100, the evaluation engine 104 (see FIG. 3*a*) can use a definition of each of the plurality of response content categories 32 having rules such as but not limited to: spelling rules for text of the response content 30; grammar rules for text of the response content 30; recognition of a response category 32 of the plurality of response categories 32 based on contained features or structure in the electronic response message 16; assignment of a topic to selected text of the response 16 content 30; and assignment of semantics to selected text of the response 16 content 30.

For example, assignment of a topic can be done by the evaluation engine 104 using a topic modeling technique of the scoring model 106 wherein each sentence or paragraph (segment of text) of the content 30 can be compared to text where the topics are known. Learning of topics by the scoring models 106 can be done by clustering sentences (segments of text) 30 with like sentences 30 using natural language techniques that also assign semantic meaning to the sentences 30. This language processing can assign semantic meaning through identification of parts of speech and use of feature-based grammars present in the content 30. Initial topic assignment can be done by a system administrator in the scoring model 106, and this initial set of topics can then be clustered with new text 30 as it is encountered in the messages 14,16.

For example, if the scoring model 106 has a set of known sentences 30 relating to the category 32 of vehicle value proposition (e.g., 'Cadillac has best in class infotainment units', or 'Silverado has best in class fuel economy'), a new sentence 30 with new vehicle feature descriptions (e.g., 'The re-designed Chevrolet Cruze has best in class passenger room') can be clustered with the known sentences 30 by the evaluation engine 104, and the topic of this new sentence 30 can thus be generalized to 'vehicle value proposition' and scored accordingly by the evaluation engine 104 using the scoring model 106 and inherently defined segments of known text utilized in scoring through the text clustering process.

Referring again to FIG. 3a, the evaluation process 100 is implemented by the evaluation engine 104 using the stored scoring model 106. The evaluation engine 104 is operated on a computer processor 108 (see FIG. 3a) using the set of instructions defined by the scoring model 106 stored in storage 123 to facilitate evaluating quality of the initial electronic response 16 from a product vendor (e.g. automotive, marine, RV) to a consumer's online electronic inquiry message 14 concerning a product inquiry, and determining the propensity of the consumer to purchase said product based on the quality of the initial electronic response 16. The evaluation process 100 implemented by the evaluation engine 104 includes: receiving the online electronic inquiry message 14 over the communications network 11, the electronic inquiry message 14 containing inquiry content 30 and a message reception timestamp 34, the inquiry content 30 including a plurality of inquiry content categories 32; identifying the inquiry content 30 pertaining to each of the plurality of inquiry content categories 32 by comparing the inquiry content 30 to a definition (in storage 123) of each of the plurality of inquiry content categories 32; receiving the electronic response message 16 over the communications network 11, the electronic response message 16 pertaining to the electronic message inquiry 14, the electronic response message 16 containing response content 30 including a plurality of response content categories 32 and a message send timestamp; identifying the response content 30 pertaining to each of the plurality of response content categories 32 by comparing the response content 30 to a definition of each of the plurality of response content categories 32 (in storage 123) and assigning portions of the response content 30 when identified to each of the plurality of response content categories 32; scoring each of the response content 30 of each of the plurality of response content categories 32 using the scoring model 106 by assigning a quantitative score 38 to the assigned response content 30 of each of the plurality of response content categories 32, the qualitative score 38 based on at least one of whether the response content 30 being present for a selected response content category 32 and a satisfactory degree of detail of the response content 30 relative to the definition of the assigned response category 32; comparing the message reception timestamp and the message send timestamp and assigning a quantitative score 40 to the message send timestamp based on a magnitude difference between the message reception timestamp and the message send timestamp; generating a response score 44 by combining the quantitative score 40 to the message send timestamp and the quantitative score to the assigned response content 30; and sending a score message 20 representing the response score 44 over the communications network 11 for display on a user interface 102 of the vendor 17.

In the above, it is recognized that the score message 20 can include indicators identifying response categories 32 missing from the response content 30 of the electronic response message 16. Alternatively, the score message 20 can include indicators identifying suggested replacement response content 30 of the message 24 for identified portions of the response content 30 of the message 16. Alternatively, the score message 20 can include indicators identifying additional response content 30 over that of the response content 30 contained in the response message 16.

As further discussed below, it is recognized that the interaction between the vendor 17 and the inquiry service 15 can be implemented in a dynamic fashion, e.g. real time communications there between, and/or the electronic inquiry message 14 and the associated electronic response message 16 are contained in a batch of a plurality of different electronic inquiry messages and the associated electronic response messages.

Referring again to FIGS. 1 and 2, it is recognized that there can be a number of different revision scenarios depending upon configuration of the inquiry service 15 as well as desired usage of the inquiry service 15 by the product vendor 17. For example, the electronic inquiry message 14 and the associated electronic response message 16 are received by the interface 103 before the electronic response message 16 is transmitted to the consumer 23 over the communications network 11 and the resultantly generated score message 20 indicates at least one action 22 pertaining to revision of the electronic response message 16 to the sender of the electronic response message 16 associated with the vendor 17.

Alternatively, the electronic inquiry message 14 and the associated electronic response message 16 are received by the interface 103 before transmission over the communications network 11 to the consumer 23; the evaluation engine 104 compares the response score 44 to a score threshold stored in storage 123 to determine whether the electronic response message 16 is below the score threshold indicative of a substandard electronic response message 16; and including indicators 22 in the score message 20 indicating portions of the electronic response message 16 contributing to the electronic response message 16 being determined as substandard, the indicators 22 relating to relevant scores of each of the response content 30 determined in the scoring step. The indicators 22 can include identification of response categories 32 missing from the response content 30 of the original electronic response message 16. The indicators 22 can include identification of suggested replacement response content 30 for identified portions of the response content 30 of the original response message 16. The indicators 22 can include identification of additional response content 30 for the response content 30 from the original response message 16. The indicators 22 can indicate the magnitude difference between the message reception timestamp and the message send timestamp as being determined substandard (e.g. time period between a difference of the two times represented by the timestamps is above a specified time threshold).

Alternative or in addition to the above, the indicators 22 can be included in a revised response message 24 configured for sending to the potential consumer 23, with explanation of the changes in relation to the score message 20. For example, the score message 20 can contain the overall response score 44 as well as individual scores assigned to one or more of the identified response content categories 32.

It is also recognize that the generation of the resultant response message 24 from the original response message 16, based on the scoring message 20 and proposed or otherwise implemented changes/additions 22 to the response content 30 of the original response message 16, can be done on an iterative basis through iterative interaction between the inquiry service 15 and the product vendor 17. For example, the product vendor 17 could receive multiple successive scoring messages 20 and proposed or otherwise implemented changes/additions 22 information based on successively modified messages 16 forwarded to the inquiry service 15 by the product vendor 17.

In one embodiment, the evaluation engine 104 receives a revised electronic response message 16 pertaining to the original electronic response message 16 previously received, the revised electronic response message 16 containing revised response content 30 and a revised message send timestamp; identifies revised response content 30 pertaining to each of the plurality of response content categories 32 by comparing the revised response content 30 to the definition of each of the plurality of response content categories 32 and assigns portions of the revised response content 30 when identified to each of the plurality of response content categories 32; scores each of the revised response content 30 of each of the plurality of response content categories 32 using the scoring model 106 by assigning a revised quantitative score 38 to the assigned revised response content 30 of each of the plurality of response content categories 32, the revised qualitative score 38 based on at least one of whether the revised response content 30 being present for a selected response content category 32 and a measured degree of detail of the revised response content 30 satisfies the definition of the assigned response category 32; comparing the message reception timestamp and the revised message send timestamp and assigning a revised quantitative score 40 to the revised message send timestamp based on a revised magnitude difference between the message reception timestamp and the revised message send timestamp; generates a revised response score 44 by combining the revised quantitative score 38 to the revised message send timestamp and the revised quantitative score 40 to the assigned revised response content 30; and sends a revised score message 20 representing the revised response score 44 over the communications network 11 for display on the user interface 102 of the vendor 17.

The inquiry service also has an update engine 110 configured to implement an update process in response to feedback information 114 received from the product vendor 17 associated with a particular original product request 14 and/or based on a plurality of feedback information 114 received from a plurality of product vendors 17 and/or system administrator(s).

In terms of the update engine 110 performance, one embodiment is where the vendor 17 can be a specified vehicle dealership of a network of dealerships. As such, the update engine 110 would receive as feedback information 114 subsequent (after the resultant response message 24 was sent to the consumer 23) a product sale indicator of a product of interest contained in the original electronic inquiry message 14, the product sale indicator indicating the consumer 23 purchased the product of interest from the specified vehicle dealership 17 as a cause of action of the resultant response message 24. Alternatively, the product sale indicator could indicate the consumer 23 purchased the product of interest from a vehicle dealership 17 of the network of dealerships other than the specified vehicle dealership 17.

Further, in general, updating the rules and model 106 can be done using feedback information 114 from the system administrator and from users 17. For example, the scoring model 106 (and associated rules) can be updated using data 114 fed back into the system from the vendor's systems 17. This data 114 can include info including the contacted state (initial response 24, telephone follow-up, purchase, etc.) of the consumer 23 and whether or not a purchase was made. Using this data 114 by the update engine 110, the various model 106 components (e.g. selected rules, etc.) can be statistically regressed against the various response content categories 32 to determine which categories 32 were most influential in positive or negative outcomes. Those components can then have their weights in the model 106 adjusted so that the model's 106 output score is revised to more accurately predict positive outcomes. For example, if a strong correlation is determined in the data 114 between pricing information being provided in the response 16 and a contacted state being achieved, then the price can contribute a higher score to the model 106. Similarly, if providing social media information (e.g. links in the response content 30) is determined in the data 114 to have no effect on positive outcomes (or has a negative effect) then its weight in the model 106 can be decreased.

As such, user feedback can used by the update engine 110 to provide checks and balances on the model 106. Users can check email messages 16,24, or components of messages 16,24, to confirm (via confirmation messages to the inquiry service 15) that the models 106 are identifying content/components/topics and clustering them properly. This can be implemented by presenting users 17 on their user interface 102 with a sentence and a derived topic by the update engine 110 messaging, and asking the user 17 whether or not the sentence and the topic presented are in alignment in the messaging. For example, if the user 17 is served up a sentence 'Silverado has best in class fuel economy' with a topic of 'Vehicle Value Proposition' then the user 17 would be expected to mark these as agreeing, thus providing the feedback information 114 for use by the update engine 110. If, however, the topic presented was 'Vehicle Price' then the user 17 could mark this as not being in agreement, thus providing the feedback information 114 for use by the update engine 110. Using this data 114 can provide for the topic identification routines of the model 106 to be augmented in light of feedback for subsequent implementation of the evaluation process 100 using the updated model 106 that incorporated the feedback information 114 by the update engine 110 via amendment of the rules and other component parts (e.g. curve 42, specified weighting of categories 32, addition or subtraction of categories, etc.) of the scoring model 106. For example, new topics (rules) can also be derived by clustering sentences (text segments) and seeing if there are clusters that do not agree with any currently known topics. If so, these can be presented to users 17 to assign by the update engine 110 new categories 32 (as the feedback data 114) for subsequent addition to the categories 32 used by the evaluation engine 104.

Specific embodiments of the use of the feedback information 114 and operation of the update engine 110 are as follows, as implemented using stored instructions by the computer processor 108 to cause:

1) receiving a product sale indicator of a product of interest contained in the electronic inquiry message 14, the product sale indicator resulting from the electronic response message 24 indicating the consumer either purchased or did not purchase the product of interest from the vendor 17; and updating the scoring model 106 to include a result of the product sale indicator for the electronic response message 24;

2) as the scoring model 106 can include a respective weighting factor for each of the plurality of response content categories 32, adjusting the respective weighting factors based on the scores each of the response content 30 assigned to each of the plurality of response content categories 32;

3) receiving a product sale indicator of a product of interest contained in the electronic inquiry message 14, the product sale indicator resulting from the electronic response message 24 indicating the consumer 23 either purchased or did not purchase the product of interest from the vendor 17; and updating the rules to include a result of the product sale indicator for the electronic response message 24;

4) identifying the electronic response message 24 as undeliverable to a network address of the consumer 23; and excluding the electronic response message 16 from use in feedback information 114 for updating the scoring model 106 to include a result of a product sale indicator for the electronic response message 24;

5) identifying the electronic response message 24 as indicating at least one of a physical visit to the vendor 17 or contact via telephone with the vendor 17 prior to sending of the electronic response message 16,24 to a network address of the consumer 23; and excluding the electronic response message 16,24 from updating the scoring model to include a result of a product sale indicator for the electronic response message 16,24;

6) determining the updating of the scoring model 106 is based on determining an individual component of the response content 30 contributed to the consumer 23 purchase in relation to the electronic response message 24. For example, the individual component can be a specific product type;

7) determining the updating of the scoring model 106 is based on determining a combination of individual components of the response content 30 contributed to the consumer 23 purchase in relation to the electronic response message 24; and 8) receiving a product sale indicator of a product of interest contained in the electronic inquiry message 14, the product sale indicator resulting from the electronic response message 24 indicating the consumer 23 either purchased or did not purchase the product of interest from the vendor 17; and updating the rules to include a result of the product sale indicator for the electronic response message 24. For example, updating the rules can be based on determining an individual component of the response content 30 contributed to the consumer purchase in relation to the electronic response message. For example, updating the rules can be based on determining a combination of individual components of the response content contributed to the consumer purchase in relation to the electronic response message.

In terms of the product sale indicator, the product sale indicator can be represented as a non product sale if the product sale indicator is not received within a specified time period relative to at least one of the message reception time and the message response time.

Referring to FIGS. 7-10, shown are examples of how the scoring model 106 can be implemented in an end user tool as provided by the inquiry service 15, proving examples of the display data sent to the computer 101 of the product vendor 17 from the inquiry service 15. Also shown is the results of revised content 30 resubmitted to the inquiry service as amended messages 16, whereby the evaluation engine 104 updates the score message 20 and the corrections/indicators 22. Reviewing the figures from FIG. 7 to FIG. 10, in order, one can see how the scoring is updated as content 30 is added to the email 16. The scoring can be dynamically updated by the evaluation engine 104 as it is reading and interpreting/identifying the email 16 text and dynamically updating the score and the scoring points based on the rules, content categories 32 and the original content 30 of the email request 14.

Figure 13:
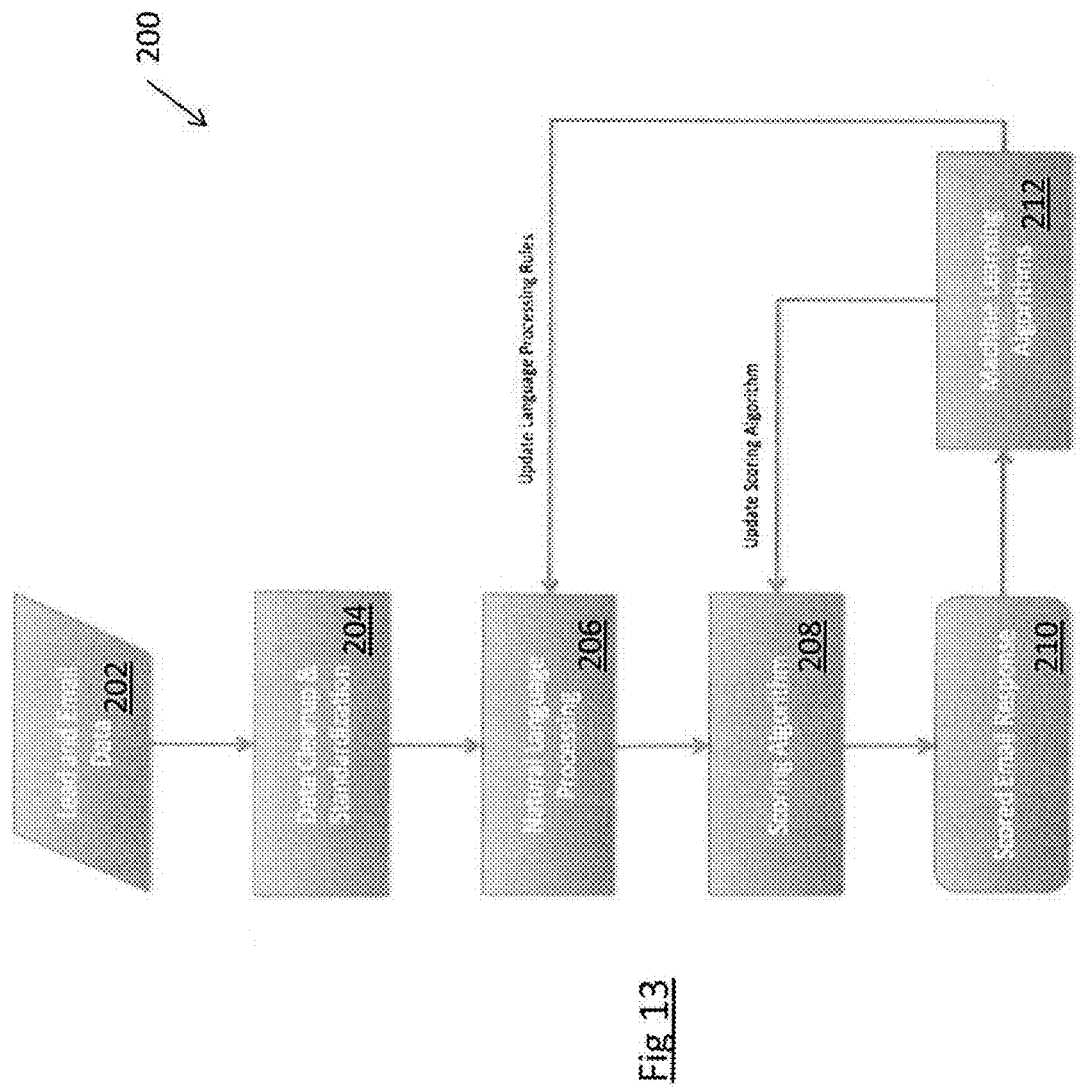
FIG. 13 shows a further embodiment of the operation of the system of FIG. 1.

The high-level example operation 200 for the system 10 is shown in FIG. 13 and FIG. 1. At step 202 of the online inquiry processing environment 10, the inquiry service 15 receives the online product requests 14 and proposed online product responses 16 for evaluation. The inquiry service 15 communicates with the plurality of product vendors 17 (e.g. sales people) over a communications network 11 to receive the online product requests 14 and proposed online product responses 16. The service 15 can load email and lead data (e.g. the content of the product request 14 and proposed online product responses 16) via a batch process if bulk scoring is used, or via a dynamic process for real time scoring. At step 204, data cleanup and standardization of the request 14 and proposed online product responses 16 content can be performed so that the request 14 content data and/or and the proposed online product responses 16 content data is in a standard format to facilitate consistent processing. In this manner, the evaluation engine 104 checks for the presence of the response content categories 32, obtained via storage 123, in the content 30 of the request 14 and/or proposed online product responses 16. At step 206, the evaluation engine 104 facilitates qualification and quantification of a quality initial product response 16 (e.g. email response) to a customer's online inquiry (e.g. product request 14) in terms of sales, or equivalently a product vendor's close rate, in terms of comparing the content 30 of the request 14 with the proposed response 16, in view of the identified categories 32 and applicable components of the scoring model 06 and associated rules 107. As such, natural language processing performs spelling and grammar checks, determine the features in the content 30, and/or derive topics and semantic role systems for the content 30. At step 208, the evaluation engine 104 applies the scoring algorithm 106 as the current scoring model to the data contained in the request 14 and response 16. At step 210, the enquiry service 15 sends the evaluation score 20 and/or response corrections 22 (proposed or otherwise implemented) back to the sales server 18 for review by the product vendor 17. It is also recognized that the evaluation process can be implemented as an iterative process reflecting incremental steps in generation of the resultant online product response 24 for submission to and/or confirmation by the inquiry service 15.

As such, the scored email response is returned to the calling process for action by the user (see FIG. 14 for an example score 20 result set). At step 212, the update engine 110 can implement an update process in response to feedback information 114 received from the product vendor 17 associated with a particular original product request 14 and/or based on a plurality of feedback information 114 received from a plurality of product vendors 17 and/or system administrator(s). As such, machine learning algorithms implemented by the update engine 110 can, using the data obtained from processing the leads 14 and emails 16, adapt and update the language processing rules 107 and scoring modules 106.

Accordingly, once the product vendor 17 has finalized the proposed online product response 16 through interaction and review of the evaluation score 20 and/or response corrections 22 with the inquiry service 15, the product vendor 17 then sends the resultant online product response 24 (representing changes to the content of the original proposed online product response 16 based on the evaluation score 20 and/or response corrections 22) back to the potential customer 23 in response to the original online product request 14.

Figure 11:
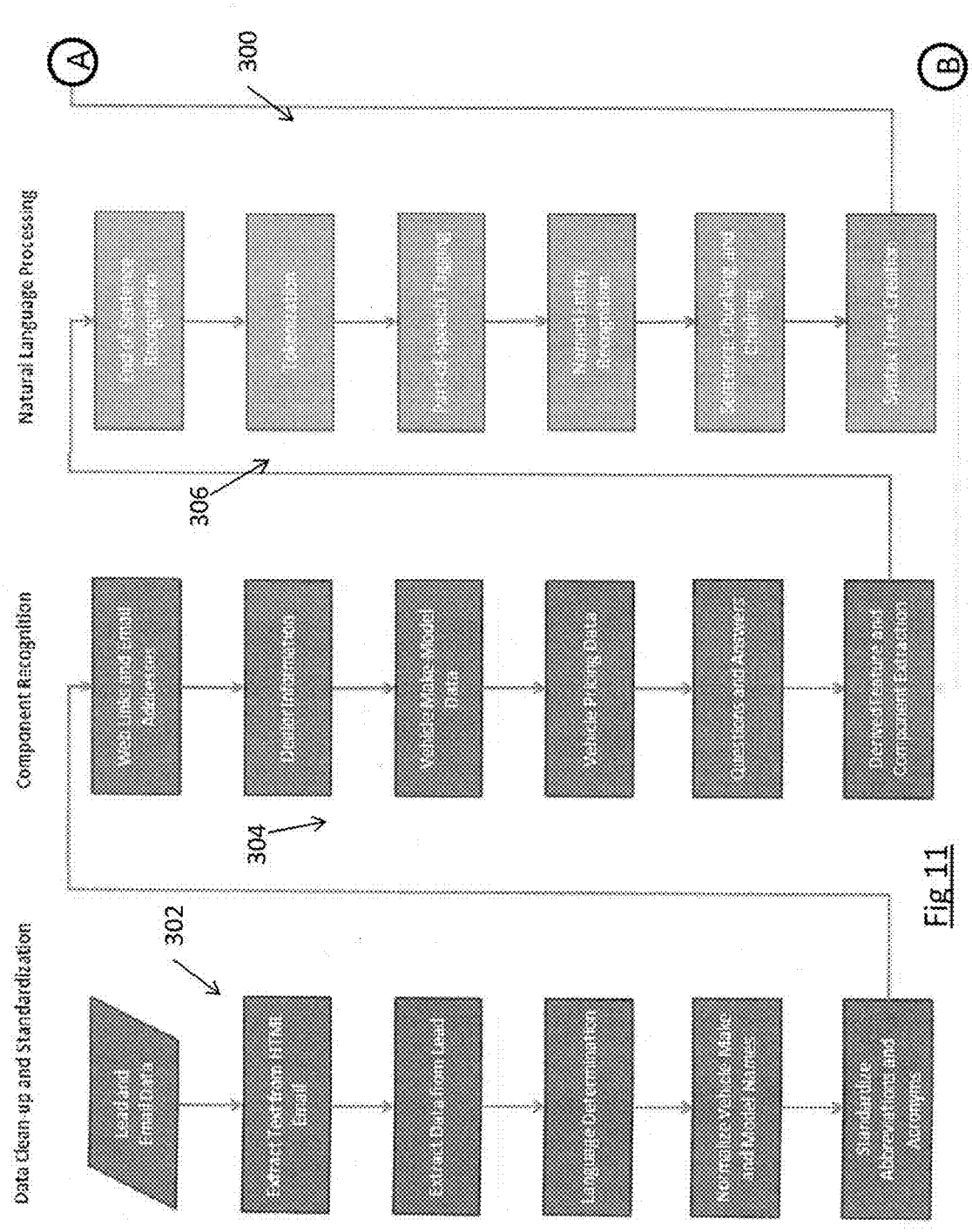
FIGS. 11 and 12 show an example flowchart for operation of the system of FIG. 1.
Figure 12:
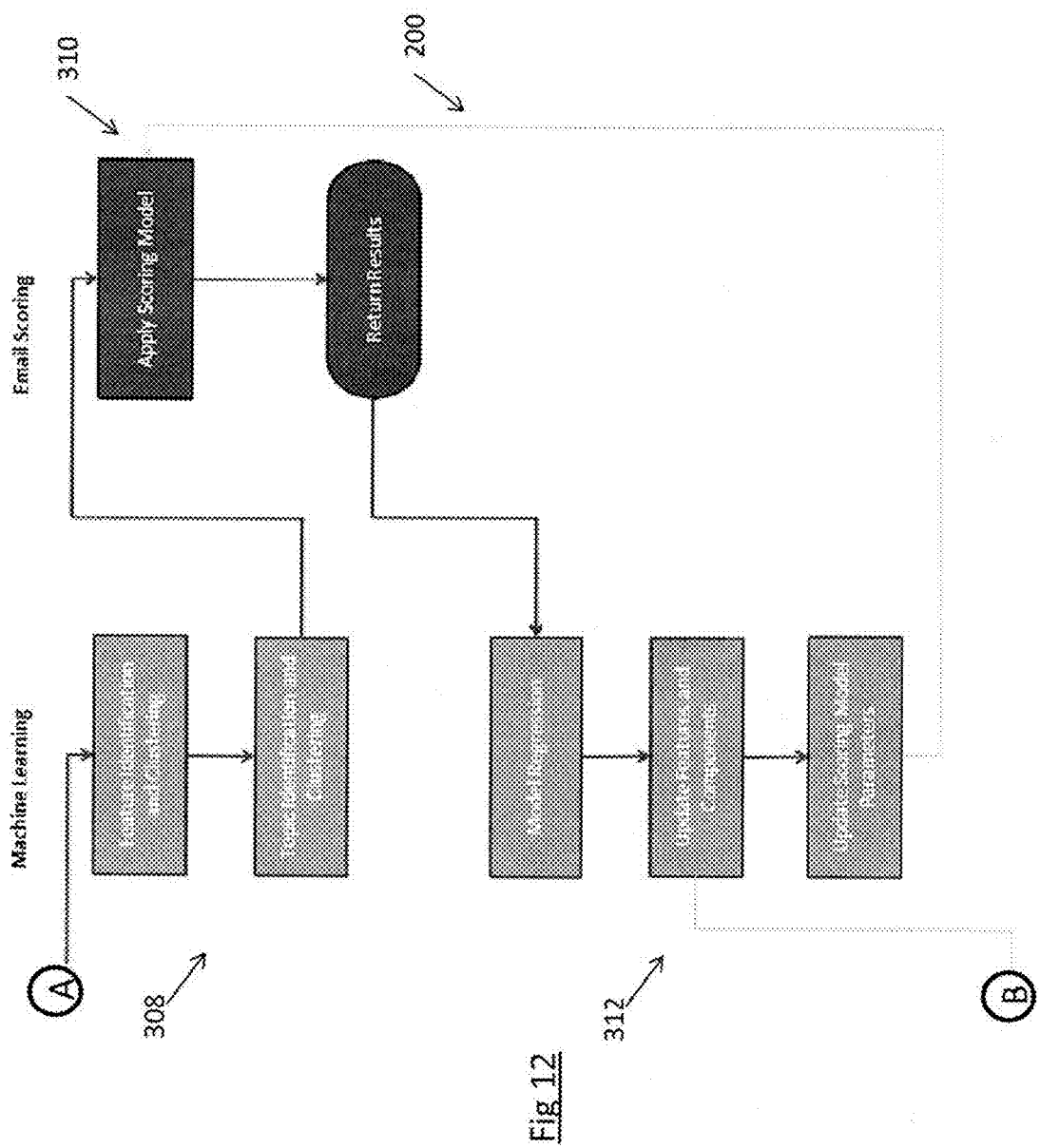

Referring to FIGS. 11 and 12, shown is a further example 300 of operation of the evaluation engine 104 and update engine 110 of the enquiry service 15. Provides are example steps for data clean up and standardization at step set 302, component recognition at step set 304 including category 32 determination of the content 30, natural language processing at step set 306 implementing the rules 107 for content 30 processing, step set 308 including further application of the rules 107 for pattern recognition of the content 30 (e.g. feature and topic identification and clustering for pattern recognition algorithms), step set 310 for application of the scoring algorithm using the identified content categories 32 and identified pattern features and clusters through comparison of the content 30 of the request 14 with that included in the proposed response 16, step set 312 implemented by the update engine 110 to update the rules 107 and the scoring model 106.

Figure 3A:
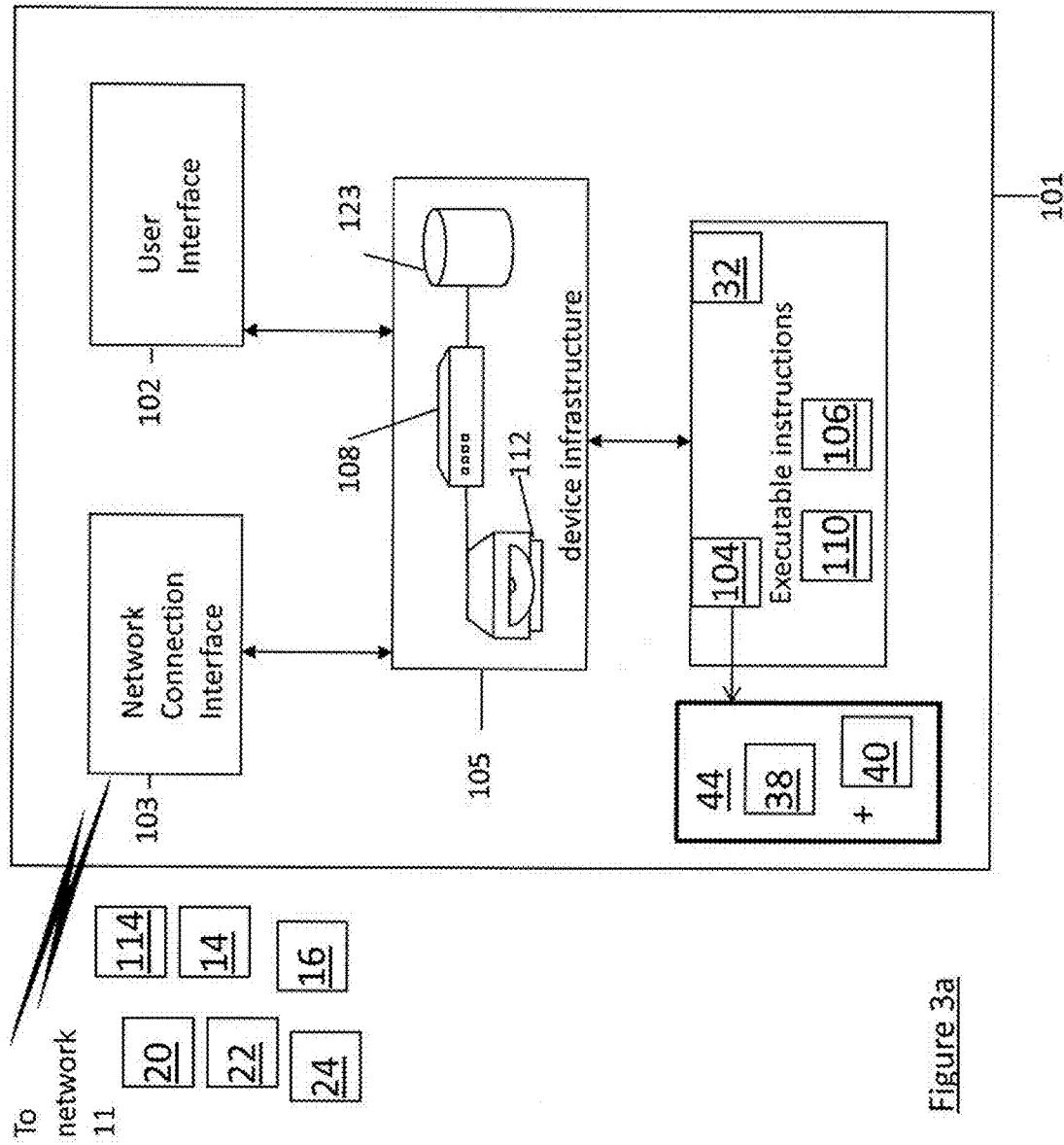
FIG. 3a shows an example computer configuration for the inquiry service shown in FIG. 1.
Figure 3B:
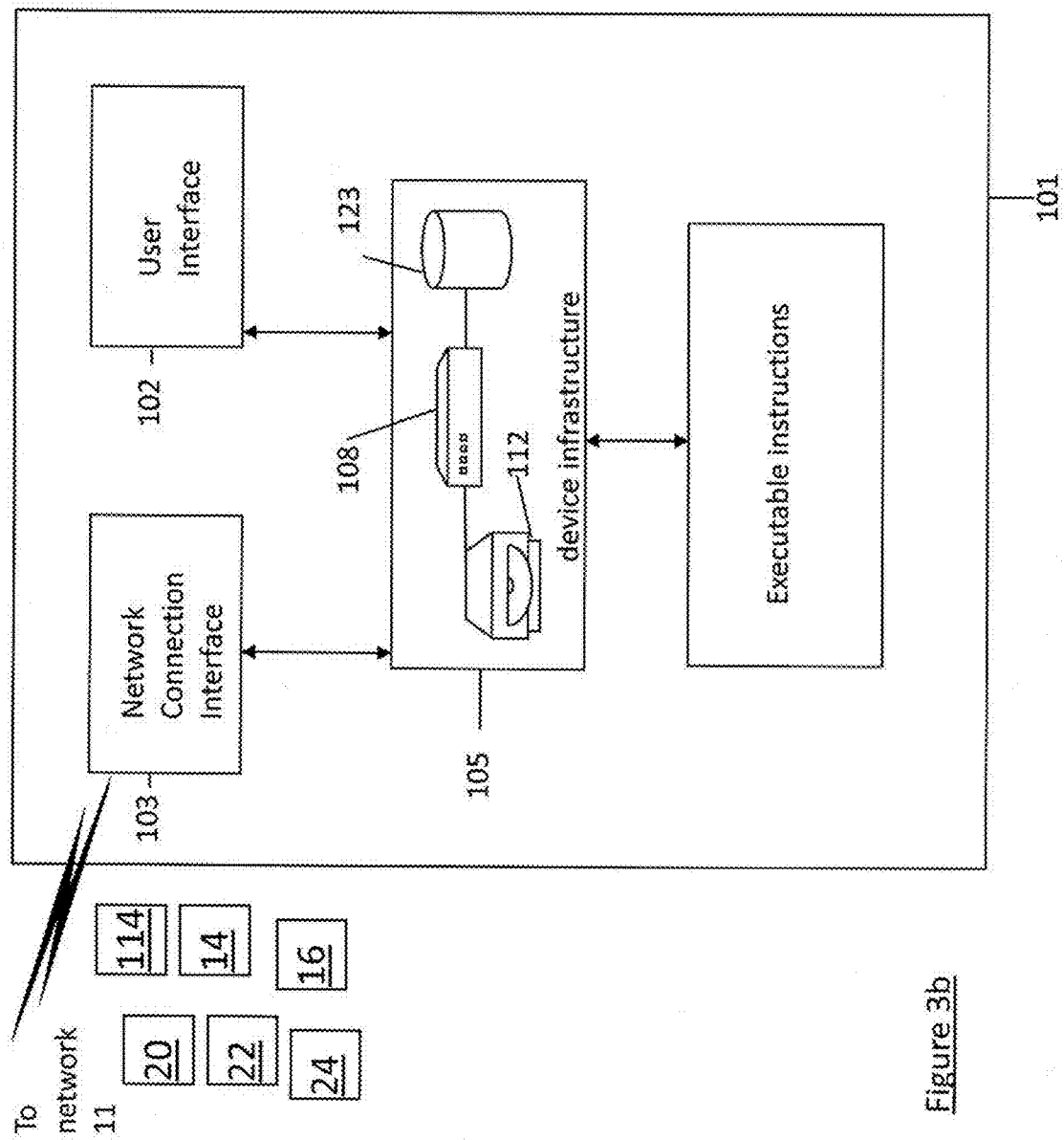
FIG. 3b shows an example computer configuration for the sales server shown in FIG. 1.

Referring to FIGS. 3a and 3b, shown are example computer systems 101 of the inquiry server 12 and the sales server 18 respectively. The computing device 101 of the environment 10 can include a network connection interface 103, such as a network interface card or a modem, coupled via connection to a device infrastructure 105. The connection interface 103 is connectable during operation of the devices 101 to the network 11 (e.g. an Intranet and/or an extranet such as the Internet), which enables the devices 101 to communicate with each other (e.g. that of the vendor 17, the inquiry service 15) as appropriate. The network 11 can support the communication of the network messages for the various transmitted data 14,16,24,20,22 there between.

Referring again to FIGS. 3a,3b, the device 101 can also have a user interface 102, coupled to the device infrastructure 104 by connection, to interact with a user (e.g. dealer, system 108 administrator, etc.). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 105.

Referring again to FIG. 3a,3b, operation of the device 101 is facilitated by the device infrastructure 105. The device infrastructure 105 includes one or more computer processors 108 and can include an associated memory 123 (e.g. a random access memory). The memory 123 is used to store data for access by the respective user and/or operating system/executable instructions of the device 101. The computer processor 108 facilitates performance of the device 101 configured for the intended task through operation of the network interface 103, the user interface 102 and other application programs/hardware (e.g. 110,104) of the device 101 by executing task related instructions. These task related instructions can be provided by an operating system, and/or software applications located in the memory 123, and/or by operability that is configured into the electronic/digital circuitry of the processor(s) 108 designed to perform the specific task(s). Further, it is recognized that the device infrastructure 105 can include a computer readable storage medium 112 coupled to the processor 108 for providing instructions to the processor 108 and/or to load/update the instructions. The computer readable medium 112 can include hardware and/or software such as, by way of example only, magnetic disks, magnetic tape, optically readable medium such as CD/DVD ROMS, and memory cards. In each case, the computer readable medium 112 may take the form of a small disk, floppy diskette, cassette, hard disk drive, solid-state memory card, or RAM provided in the memory module 123. It should be noted that the above listed example computer readable mediums 112 can be used either alone or in combination.

Further, it is recognized that the computing device 101 can include the executable applications comprising code or machine readable instructions for implementing predetermined functions/operations including those of an operating system and the system tools/modules 104,106,110, for example. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 408 may use or comprise the capabilities of a controller or microprocessor, for example. Accordingly, any of the functionality of the executable instructions 108 (e.g. through modules associated with selected tasks) may be implemented in hardware, software or a combination of both. Accordingly, the use of a processor 108 as a device and/or as a set of machine-readable instructions is hereafter referred to generically as a processor/module for sake of simplicity. The memory 123 is used to store data locally as well as to facilitate access to remote data stored on other devices 101 connected to the network 99.

The data can be stored in a table, which can be generically referred to as a physical/logical representation of a data structure for providing a specialized format for organizing and storing the data. General data structure types can include types such as but not limited to an array, a file, a record, a table, a tree, and so on. In general, any data structure is designed to organize data to suit a specific purpose so that the data can be accessed and worked with in appropriate ways. In the context of the present environment 10, the data structure may be selected or otherwise designed to store data for the purpose of working on the data with various algorithms executed by components of the executable instructions, depending upon the application thereof for the respective device 101. It is recognized that the terminology of a table/database is interchangeable with that of a data structure with reference to the components of the environment 10.

We claim:

1. A computer-implemented method for online evaluating, at an inquiry server, an electronic response message provided by a computer-implemented vehicle product vendor for an online electronic inquiry message from a consumer concerning a vehicle product inquiry, the method comprising the steps of:

receiving, at the inquiry server, the online electronic inquiry message over a communications network in real time, the electronic inquiry message containing inquiry content and a message reception timestamp of the electronic inquiry message, the inquiry content including a plurality of inquiry content categories associated with vehicle inquiries;

identifying, at the inquiry server, the inquiry content pertaining to each of the plurality of inquiry content categories by comparing the inquiry content to a definition of each of the plurality of inquiry content categories;

receiving, at the inquiry server, the electronic response message over a communications network in real time, the electronic response message pertaining to the electronic inquiry message, the electronic response message containing response content including a plurality of response content categories associated with vehicle inquiries and a message send timestamp of the electronic response message;

identifying, at the inquiry server, the response content pertaining to each of the plurality of response content categories by comparing the response content to a definition of each of the plurality of response content categories and assigning portions of the response content when identified to each of the plurality of response content categories;

dynamically scoring, at the inquiry server, and in real-time the response content pertaining to each of the plurality of response content categories using a scoring model by assigning a quantitative score to the assigned response content of each of the plurality of response content categories, the quantitative scores based on at least one of the response content being present for a selected response content category and a degree of detail of the response content relative to the definition of the selected response category, the quantitative score being updated dynamically and in real time as subsequent portions of the response content are received and analyzed;

comparing, at the inquiry server and in real time, the message reception timestamp and the message send timestamp and assigning a quantitative score to the message send timestamp based on a magnitude difference between the message reception timestamp and the message send timestamp;

generating, at the inquiry server, a response score, in real-time by combining the quantitative score to the message send timestamp and the quantitative score to the assigned response content;

sending from the inquiry server a score message, in real-time representing the response score over the communications network for display on a user interface of the computer-implemented vehicle product vendor;

receiving feedback information, in real-time across the communications network from the user interface of the vehicle product vendor defining whether the electronic response message resulted in a positive outcome; and in response to the feedback information:
  determining, at the inquiry server in real-time, which of the response content categories of the scoring model were linked to the positive outcome; and
  in response to said determining, said updated dynamically of the scoring model by adjusting a weighting of each of the response content categories for determining the quantitative score to the assigned response content.

2. The method of claim 1, wherein the score message includes indicators identifying response categories missing from the response content of the electronic response message.

3. The method of claim 1, wherein the score message includes indicators identifying suggested replacement response content for identified portions of the response content.

4. The method of claim 1, wherein the score message includes indicators identifying additional response content for the response content.

5. The method of claim 1, wherein the plurality of inquiry content categories are selected from the group consisting of: consumer name; product of interest; and one or more questions related to the vehicle product of interest.

6. The method of claim 5, wherein the vehicle product of interest is a vehicle selected from the group consisting of: a passenger vehicle; a transport vehicle; a land-based recreational vehicle; and a water-based recreational vehicle.

7. The method of claim 1, wherein the plurality of response content categories are selected from the group consisting of: introduction content; vehicle product value proposition; vehicle product availability; response to a consumer question; a question by the vehicle product vendor; stated vehicle product price; vendor value proposition; vendor contact details; content grammar and spelling; structure and content of a message subject line; and inclusion of active links.

8. The method of claim 7, wherein a vehicle product of interest is a vehicle selected from the group consisting of: a passenger vehicle; a transport vehicle; a land-based recreational vehicle; and a water-based recreational vehicle.

9. The method of claim 1, wherein the electronic response message is an email directed to the consumer as a potential customer of a vehicle dealership.

10. The method of claim 1, wherein a definition of each of the plurality of response content categories includes rules selected from the group consisting of: spelling rules for text of the response content; grammar rules for text of the response content; recognition of a response category of the plurality of response categories based on contained features or structure in the electronic response message; assignment of a topic to selected text of the response; and assignment of semantics to selected text of the response content.

11. The method of claim 1, wherein the electronic inquiry message and the associated electronic response message are contained as a plurality of different electronic inquiry messages and the associated electronic response messages.

12. The method of claim 1, wherein the electronic inquiry message and the associated electronic response message are received before the electronic response message is transmitted to the consumer over the communications network and the score message indicates at least one action pertaining to revision of the electronic response message to a sender of the electronic response message associated with the vehicle product vendor.

13. The method of claim 1 further comprising the steps of:
  intercepting the electronic response message before transmission over the communications network to the consumer;
  comparing the response score to a score threshold to determine whether the electronic response message is below the score threshold indicative of a substandard electronic response message; and
  including indicators in the score message indicating portions of the electronic response message contributing to the electronic response message being determined as substandard, the indicators relating to relevant scores of each portion of the response content determined in said scoring step.

14. The method of claim 13, wherein the indicators include identification of response categories missing from the response content of the electronic response message.

15. The method of claim 13, wherein the indicators include identification of suggested replacement response content for identified portions of the response content.

16. The method of claim 13, wherein the indicators include identification of additional response content for the response content.

17. The method of claim 16, wherein the indicators indicate the magnitude difference between the message reception timestamp and the message send timestamp as being determined to be substandard.

18. The method of claim 1, wherein the vehicle product vendor is a specified vehicle dealership of a network of dealerships.

19. The method of claim 18 further comprising the step of:
receiving a vehicle product sale indicator of a vehicle product of interest contained in the electronic inquiry message, the vehicle product sale indicator resulting from the electronic response message indicating the consumer purchased the vehicle product of interest from a specified vehicle dealership.

20. The method of claim 18 further comprising the step of:
receiving a vehicle product sale indicator of a vehicle product of interest contained in the electronic inquiry message, the product sale indicator resulting from the electronic response message indicating the consumer purchased the vehicle product of interest from a vehicle dealership of the network of dealerships other than the specified vehicle dealership.

21. The method of claim 13 further comprising the steps of:
receiving a revised electronic response message pertaining to the electronic response message, the revised electronic response message containing revised response content and a revised message send timestamp;
identifying revised response content pertaining to each of the plurality of response content categories by comparing the revised response content to the definition of each of the plurality of response content categories and assigning portions of the revised response content when identified to each of the plurality of response content categories;
scoring of the revised response content pertaining to each of the plurality of response content categories using a scoring model by assigning a revised quantitative score to the assigned revised response content of each of the plurality of response content categories, the revised quantitative scores based on at least one of the revised response content being present for a selected response content category and a degree of detail of the revised response content relative to the definition of the selected response category;
comparing the message reception timestamp and the revised message send timestamp and assigning a revised quantitative score to the revised message send timestamp based on a revised magnitude difference between the message reception timestamp and the revised message send timestamp;
generating a revised response score by combining the revised quantitative score to the revised message send timestamp and the revised quantitative score to the assigned revised response content; and
sending a revised score message representing the revised response score over the communications network for display on the user interface of the vehicle product vendor.

22. The method of claim 1 further comprising the steps of:
receiving a vehicle product sale indicator of a vehicle product of interest contained in the electronic inquiry message, the vehicle product sale indicator resulting from the electronic response message indicating the consumer either purchased or did not purchase the vehicle product of interest from the vehicle product vendor; and
updating the scoring model to include a result of the vehicle product sale indicator for the electronic response message.

23. The method of claim 21, wherein the scoring model includes a respective weighting factor for each of the plurality of response content categories.

24. The method of claim 23 wherein said updating includes adjusting the respective weighting factors based on the scores for the response content assigned to each of the plurality of response content categories.

25. The method of claim 10 further comprising the steps of:
receiving a vehicle product sale indicator of a vehicle product of interest contained in the electronic inquiry message, the vehicle product sale indicator resulting from the electronic response message indicating the consumer either purchased or did not purchase the vehicle product of interest from the vehicle product vendor; and
updating the rules to include a result of the vehicle product sale indicator for the electronic response message.

* * * * *